United States Patent [19]
Yamamoto

[11] Patent Number: 5,934,167
[45] Date of Patent: Aug. 10, 1999

[54] PHOTOGRAPHIC MATERIAL FEEDER APPARATUS

[75] Inventor: Yuji Yamamoto, Wakayama, Japan

[73] Assignee: Noritsu Koki Co., Ltd., Wakayama, Japan

[21] Appl. No.: 08/876,428

[22] Filed: Jun. 16, 1997

Related U.S. Application Data

[63] Continuation of application No. 08/404,672, Mar. 15, 1995, abandoned.

[30]  Foreign Application Priority Data

| Mar. 17, 1994 | [JP] | Japan | .................................... | 6-046890 |
| Mar. 17, 1994 | [JP] | Japan | .................................... | 6-047225 |
| Mar. 30, 1994 | [JP] | Japan | .................................... | 6-061198 |

[51] Int. Cl.$^6$ .............. B26D 7/00; B26D 5/20; B65H 35/04; G03B 27/58
[52] U.S. Cl. ................. 83/650; 83/210; 83/364; 83/370; 355/41; 355/72
[58] Field of Search ............... 83/364, 367, 369, 83/370, 650, 209, 210, 513, 559, 560; 355/72, 73, 41, 42

[56]  References Cited

U.S. PATENT DOCUMENTS

| 4,693,591 | 9/1987 | Saijo et al. ................................. | 355/41 |
| 4,782,365 | 11/1988 | Takagi ....................................... | 355/41 |
| 4,908,667 | 3/1990 | Ikerua et al. .............................. | 355/256 |
| 4,969,016 | 11/1990 | Kudoh ....................................... | 83/650 |
| 5,021,824 | 6/1991 | Higashi et al. ............................ | 355/72 |
| 5,036,353 | 7/1991 | Sakamoto .................................. | 355/72 |
| 5,181,066 | 1/1993 | Ozawa et al. ............................. | 355/72 |
| 5,187,520 | 2/1993 | Muller et al. .............................. | 355/72 |
| 5,223,854 | 6/1993 | Shimizu .................................... | 346/24 |
| 5,260,740 | 11/1993 | Seto ......................................... | 355/41 |
| 5,307,114 | 4/1994 | Nitsch et al. ........................... | 355/73 X |
| 5,335,045 | 8/1994 | Kunz et al. ................................ | 355/72 |
| 5,412,450 | 5/1995 | Kojima ...................................... | 355/43 |
| 5,438,388 | 8/1995 | Arimoto et al. ........................... | 355/72 |
| 5,504,555 | 4/1996 | Yamamoto ................................ | 355/72 |

FOREIGN PATENT DOCUMENTS

| 0 570 651 | 11/1993 | European Pat. Off. . |
| 41 26 578 | 2/1993 | Germany . |

OTHER PUBLICATIONS

Patent Abstracts of Japan, vol. 018, No. 178 (P–1717), Mar. 25, 1994 & JP–A–05 341396 (Konica Corp.) Dec. 24, 1993 * abstract *.

Patent Abstract of Japan, vol. 017, No. 320 (P–1558), Jun. 17, 1993 & JP–A–05 034833 (Noritsu Koki Co., LTD.), Feb. 12, 1993 * abstract *.

Primary Examiner—Rinaldi I. Rada
Assistant Examiner—Charles Goodman
Attorney, Agent, or Firm—Wenderoth, Lind & Ponack, LLP

[57]  ABSTRACT

A photographic material feeder apparatus includes a paper conveyor for conveying cut papers to an exposure station and a plurality of paper magazines arranged in a cluster around a loading end of the conveyor. Each magazine accommodates therein a respective paper roll having a width corresponding to a respective size of a film image to be printed, and each magazine has a respective paper supply opening directed at the loading end of the conveyor. A plurality of paper feeders, one each positioned adjacent the opening of a respective the magazine, is operable to feed therefrom a strip of paper from the respective paper roll towards the loading end of the conveyor. A plurality of paper cutters, one each positioned adjacent a respective paper feeder, is operable to cut the strip of paper fed thereby from the respective magazine to a given length to produce a desired size of cut paper to be fed to the loading end of the conveyor.

3 Claims, 22 Drawing Sheets

Fig.7

| PAPER WIDTH | SENSOR SWITCH 1 | SENSOR SWITCH 2 | SENSOR SWITCH 3 | SENSOR SWITCH 4 |
|---|---|---|---|---|
| 1 5 2 | ○ | ○ | | |
| 1 2 7 | ○ | | ○ | |
| 1 0 2 | ○ | ○ | ○ | |
| 8 9 | ○ | | | ○ |
| 8 3 | ○ | ○ | | ○ |

Fig.10(a)(i) Fig.10(a)(ii) Fig.10(b)(i) Fig.10(b)(ii)
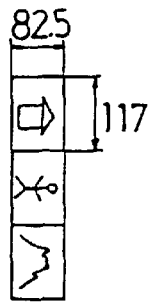 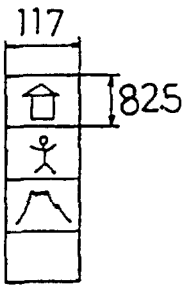 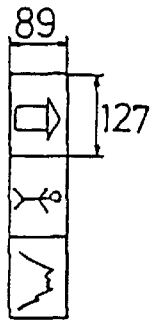 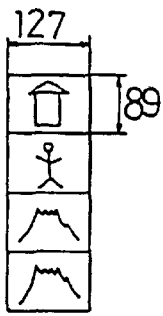
Fig.10(c)(i) Fig.10(c)(ii) Fig.10(d)(i) Fig.10(d)(ii)
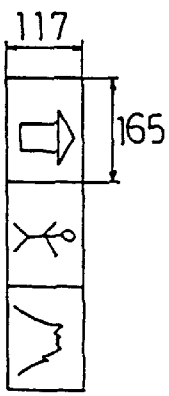 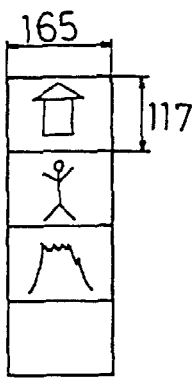 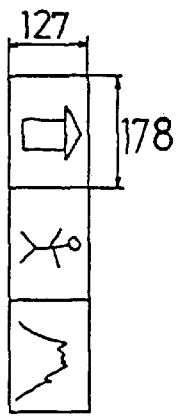 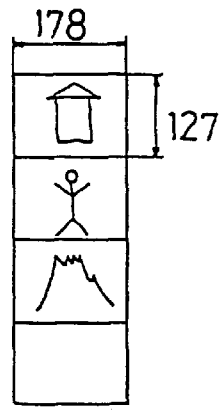
Fig.10(e)(i) Fig.10(e)(ii) Fig.10(f)(i) Fig.10(f)(ii)
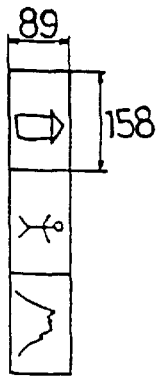 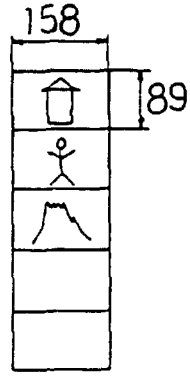 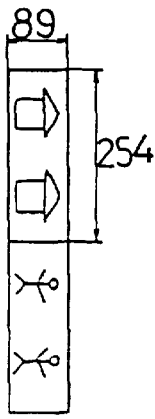 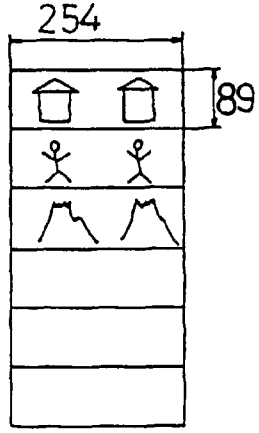

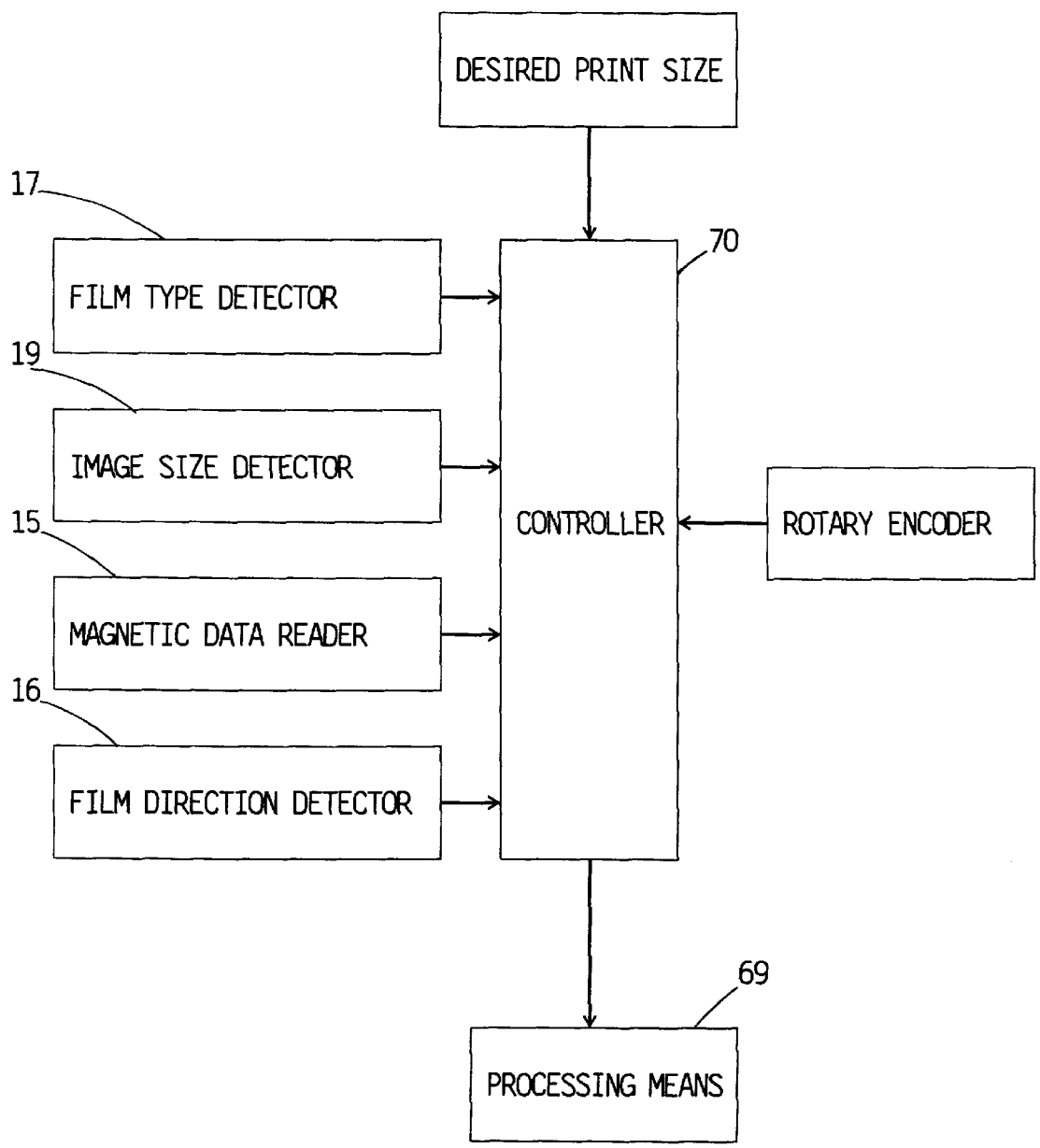

Fig.18(a) 8 INCHES-WIDE PAPER

| A | B | C | D | |
|---|---|---|---|---|
| 8×5" | 8×10" | 8×12" | 4×6" | 4×12" |
| | | | 4×6" | 4×12" |

Fig.18(b) 10 INCHES-WIDE PAPER

| 10×8" | 5×7" | 5×3.5" | 10×3.5" |
|---|---|---|---|
| | 5×7" | 5×3.5" | |

Fig.18(c) 12 INCHES-WIDE PAPER

| 6×9" | 12×8" | 6×4" | 12×4" |
|---|---|---|---|
| 6×9" | | 6×4" | | ified.

PHOTOGRAPHIC MATERIAL FEEDER APPARATUS

This application is a continuation of now abandoned application, Ser. No. 08/404,672, filed Mar. 15, 1995.

BACKGROUND OF THE INVENTION

The present invention relates to a photographic material feeder apparatus for cutting a strip of photographic material to sheets of a given length and transferring the photographic material sheets to an exposure station, and more particularly, to a photographic material feeder apparatus for producing and supplying print sheets of different sizes from a roll of photographic material paper for printing in an exposure station.

Photographic printers are known for printing images from a negative film (referred to as film hereinafter) onto sheets of photographic material (referred to as papers hereinafter). More specifically, a strip of the paper provided in a roll form is cut into pieces of a length which are then transferred to the exposure station for printing. As the paper of a roll form is accommodated in a paper magazine, its leading end is drawn out for feeding. When it is desired to print a different size of images at the exposure station in the photographic printer, paper sheets of a corresponding size have to be supplied.

For allowing the selection of a desired size of the paper, there may be provided a plurality of paper rolls of different widths in their respective magazines. The paper of the desired size can be supplied by selecting and loading its magazine. In common, the print papers are classified by size into E, L, 2E, 2L, European, panorama, HDTV, ⅛, ⅙, ¼, and other formats. Therefore, a number of the paper magazines are prepared and once one of the sizes is selected, its magazine is loaded to replace an existing one. This action will disturb more or less the efficiency of the exposure process during printing.

In addition, the size of images in frames of a film is classified into two types: a half size and a full size. The half size is equal to ½ of a full frame and its film images are thus elongated widthwisely of the film or at a right angle to the lengthwise direction of the film. If the half size image is projected in the same manner as for the full size, it lengthwise edges may be off the paper. For compensation, the film with half size images is set at a right angle to the feeding direction of the paper for "transverse" printing. In general, the film is oriented in parallel to the feeding of the paper for "longitudinal" printing.

It is however common that the film carrying half size images and the film carrying full size images are mixedly loaded for printing operations. The operator is thus required to determine the feeding direction of a film whenever a film carrying different image sizes is loaded. This will decrease the efficiency of a printing process.

As an increasing number of different print sizes of images are introduced, paper rolls with different widths have to be supplied. The number of magazines accommodating the paper rolls is thus increased and the replacement of the magazines will take a considerable length of time, thus disturbing the routine of the painting operation. It will be most difficult for the operator to select one from a number of the paper magazines. As the printer apparatus requires help from the operator, it cannot be operated in a fully automatic mode.

A number of the paper rolls may be varied in sensitivity thus requiring a troublesome color compensation step during the printing process. Also, some of the paper rolls which are used with less frequency may become deteriorated with time.

It is an object of the present invention to provide a photographic material feeder apparatus capable of printing different sizes of film images efficiently on photographic papers which are selected and supplied automatically from one or a minimum number of paper rolls.

SUMMARY OF THE INVENTION

A photographic material feeder apparatus according to one aspect of the present invention includes a paper conveyor for conveying cut papers to an exposure station, a plurality of paper magazines accommodating therein respective paper rolls which are different in width for corresponding to the size of images in a film and each having a paper supply opening provided therein to face a loading end of the paper conveyor, a plurality of paper feeders each arranged for feeding a strip of paper from the paper roll in a respective paper magazine towards the loading end of the paper conveyor, and a plurality of paper cutters each arranged for cutting the strip of paper fed from the respective paper magazine to a given length to produce a desired size of the cut paper. One of the paper magazines which accommodates the paper roll with a width corresponding to the size of a desired print thus may be selected. A strip of paper is drawn out from the paper roll in the magazine and cut to a given length to produce a cut paper of the desired print size which is then transferred by the paper conveyor to the exposure station for printing.

According to a further aspect of the present invention, the feeder apparatus further includes an image size sensor for detecting the size of an image in the film to be printed, a width detecting means for detecting the width of the paper roll in the paper magazine, and a controller responsive to image size data from the image size sensor and paper roll width data from the width detecting means for selecting one of the paper rolls in their respective paper magazines and actuating the respective paper feeder and the respective paper cutter for the selected paper roll to produce a desired size of the cut paper corresponding to the size of the image in the film and for feeding such cut paper to the loading end of the paper conveyor. The size of an image in the film to be printed is detected by the image size sensor while the width of the paper roll in each paper magazine is detected by the width detecting means. Such detected data are sent as detection signals to the controller which in turn selects one of the paper magazines accommodating the paper roll of a width appropriate to the size of a desired print by comparing the detection signals. The controller then actuates the paper feeder and the paper cutter connected to the selected paper roll. As a result, an appropriate size of the cut paper corresponding to the size of the print is produced and transferred by the paper conveyor to the exposure station.

A photographic material feeder apparatus according to a yet further aspect of the present invention includes a paper is conveyor for conveying cut papers to an exposure station, a plurality of paper magazines accommodating therein respective paper rolls which are different in width corresponding to the size of images in a film and disposed in rearwardly or upstream of a loading end of the paper conveyor, a plurality of paper feeders each arranged for feeding a strip of paper from the paper roll in a respective paper magazine towards the loading end of the paper conveyor, a plurality of paper cutters each arranged for cutting the strip of paper fed from the respective paper magazine to a given length to produce a desired size of the cut paper, and a paper transfer system for receiving the cut papers from the paper cutter and transferring them to the loading end of the paper conveyor. One of the paper magazines disposed upstream of the paper conveyor which accommodates the paper roll with a width corresponding to the size of a desired print is selected. A strip of paper is drawn out from the paper roll in such magazine and cut to a given length to produce a cut paper of the desired print size which is received by the paper transfer system. The paper transfer system passes the cut paper to the loading end of the paper conveyor. The paper conveyor then conveys the cut paper to the exposure station for printing.

According to a further aspect of the present invention, the paper transfer system of the feeder apparatus includes a paper rotation device for shifting the orientation of the cut papers received from the paper cutter by a rotating operation. The paper rotation device of the paper transfer system, upon receiving the cut paper of a desired length from the paper cutter, shifts the orientation of the cut paper by rotation before transferring the cut paper to the paper conveyor. Accordingly, the cut paper can be subjected to different printing direction types of exposure action.

In general, the print size is 3¼×4¾ in inch scale for E format, 4¾×6½ for 2E format, 3½×5 for L format, and 5×7 for 2L format. More specifically, the ratio of a standard print between width and length is 1:√2 (i.e. 1 to the square root of 2).

It is thus understood that an E or L print size is prepared by cutting a 2E or 2L paper strip in two by the paper cutter and turning a cut half by 90 degrees with the paper rotation device or means. As the cut paper is turned 90 degrees by the paper rotation device, it can easily be oriented in a correct direction before being loaded to the paper conveyor, corresponding to a shift from full size to half size of a film image, from longitudinal printing to transverse printing, or vice versa. This will eliminate changing of the feeding direction of the film.

According to a still further aspect of the present invention, the paper rotation device in the feeder apparatus is mounted to one end of an arm which is coupled at the other end thereof to an arm actuator for pivotal movement. The cut paper of a desired length may be received from any of the paper magazines and loaded to the loading end of the paper conveyor by the pivotal action of the arm which is performed by the arm actuator.

Also, the orientation of the cut paper is changed by the operation of the paper rotation device mounted to the other or distal end of the arm before being loaded to the paper conveyor. Cut paper of E or L size can thus be prepared from a 2E or 2L paper strip and oriented for use for either longitudinal or transverse printing at the exposure station.

According to a further aspect of the present invention, the photographic material feeder apparatus further includes an image size detecting means for detecting the size of an image in the film to be printed, a width detecting means for detecting the width of the paper roll in the paper magazine, a film feeding direction detecting means for detecting the printing direction of the film at the exposure station, and a controller responsive to image size data from the image size detecting means, paper roll width data from the width detecting means, and film printing direction data from the film feeding direction detecting means for selecting one from the paper rolls in their respective paper magazines and actuating the paper transfer system as well as the paper feeder and the paper cutter for the selected paper roll to produce and transfer a desired size of the cut paper to the loading end of the paper conveyor.

The size of an image in the film to be printed is detected by the image size detecting means and the width of the paper roll in the paper magazine is detected by the width detecting means. By comparing the detection signals of the two detecting means, the controller selects one of the paper magazines which accommodates the paper roll with a width appropriate to the size of the print. Then, the paper feeder and the paper cutter for the selected paper roll are actuated to feed and cut a strip of paper from the paper roll to a given length. The strip of the given length is transferred by the paper transfer system to the loading end of the paper conveyor. Simultaneously, the paper rotation device in the paper transfer system is controlled in response to the film printing direction data of the film feeding direction detecting means as well as the prescribed image size data and paper roll width data so that the orientation of the cut paper matches the printing direction of the film at the exposure station. As a result, the cut paper is definitely transferred in a correct orientation to the exposure station.

A photographic material feeder apparatus according to a further aspect of the present invention includes a paper magazine accommodating a paper roll therein for printing, a paper conveyer for conveying cut papers to an exposure station, and a paper processing means disposed between the paper magazine and the paper conveyor for separating a strip of paper from the paper magazine into cut papers of a desired size and loading the cut papers onto the paper conveyor. The paper processing means draws a strip of paper from the paper magazine and subjects it to a desired cutting process such that different sizes of the cut paper appropriate to various printing operations at the exposure station are produced without use of a plurality of paper magazines which accommodate different respective width paper rolls.

The print size is 3¼×4¾ in inch scale for E format, 4¾×6½ for 2E format, 3½×5 for L format, and 5×7 for 2L format. More specifically, the ratio of a standard print between width and length is 1:√2 (i.e. 1 to the square root of 2).

It is apparent that an E or L print size is produced by cutting a 2E or 2L paper strip into two and turning a cut half by 90 degrees.

The HDTV and panorama sizes are 3½×6¼ and 3½×10 in inch scale and are identical in width.

Accordingly, the different sizes of the cut paper can be obtained from a single paper roll by varying the cutting length.

According to a yet further aspect of the present invention, the paper processing means of the feeder apparatus includes a paper feeder for feeding out a strip of paper from the paper roll in the paper magazine, a paper cutter for cutting the strip of paper to a given length, and a paper rotating means for shifting the orientation of the cut paper of the given length by rotating and loading the cut paper to the paper conveyor. The paper processing means may be a paper feeder for feeding out a strip of paper, a paper cutter for cutting the strip of paper to a given length, and a paper rotating means for shifting the orientation of the cut paper of the given length by rotation. As a result, different sizes of the cut paper can also be produced from a single paper roll.

According to a further aspect of the present invention, the feeder apparatus further includes a paper traverse carrier device disposed between the paper cutter and the paper rotating means for moving the cut paper received from the paper cutter at a right angle to the transfer direction before transferring it to the paper rotating means, such paper traverse carrier device having a slitter mounted on an entrance thereof for slitting the cut paper length wisely to produce a desired width of a strip. The paper traverse carrier device receives the cut paper from the paper cutter by traveling at a right angle to the transfer direction and slits it length wisely to a given width. If any of the two slit strips of the cut paper is discharged directly, its center will be misaligned with the center of the exposure station. For feeding the slit strip of the cut paper to the center of the exposure station, the paper traverse carrier device moves the slit strip at a right angle to the transfer direction. As the cut paper is arbitrarily trimmed to a desired size, any greater width of the paper roll may be used with equal success.

According to a further aspect of the present invention, the paper traverse carrier device of the feeder apparatus is provided with sets of discharge rollers operable separately for discharging and transferring the slit strips produced by the slitter in sequence to the paper rotating means. The two slit strips of the cut paper separated by the slitter are driven and discharged independently by respective sets of discharge rollers of the paper transverse carrier device. Hence, a succession of the slit strips can be supplied without loss of time and any unwanted strips may be discarded if necessary.

According to a further aspect of the present invention, the feeder apparatus includes an extra cutter disposed between the paper conveyor and the paper rotating means for cutting the cut paper to a desired length. The extra cutter can be disposed between the paper cutter and the paper rotating means in the feeder apparatus for cutting the cut paper to a desired length. Accordingly, the cut paper can arbitrarily be trimmed while it is being moved.

According to a still further aspect of the present invention, the feeder apparatus includes a paper holding means provided between the paper feeder and the paper cutter for holding the cut paper temporarily, and a paper shifting means provided between the feeder and the paper rotating means for moving the cut paper forward and backward. The cut paper is moved forward and backward between the feeder and the paper rotating means so that it can be trimmed by the paper cutter while its orientation is changed by the paper rotating means. As a result, various sizes of cut strips can be produced. At the same time, cut strips of other sizes can temporarily be held by the paper holding means while the cut strips of a wanted size are fed to the paper conveyor.

According to a further aspect of the present invention, the feeder apparatus includes an image size detecting means for detecting the size of an image in the film to be printed, a film feeding direction detecting means for detecting the printing direction of the film at the exposure station, and a controller responsive to detection signals from the two detecting means for controlling the operation of the paper processing means to produce a desired size of the cut paper. The controller can respond to the image size detecting means and the film feeding direction detecting means for determining the size of a print to be used. More specifically, the image size detecting means examines whether the image to be printed is a full size or a half size while the film feeding direction detecting means detects the printing direction at the exposure station. The controller then determines the size of a cut paper from the detection data of the two detecting means. In response to the size and the printing direction, longitudinal or transverse, the paper processing means operates to produce cut papers of the correct size by a series of cutting operations and the cut papers are then loaded to the paper conveyors.

BRIEF DESCRIPTION OF THE DRAWINGS

FIG. 7 is a chart showing mode selection of paper width detector of the second embodiment;

FIGS. 10 (a)–10 (f) are schematic views showing different sizes of prints in the second embodiment;

FIG. 17 is a block diagram according to the fourth embodiment;

FIGS. 18(a)–18 (c) are schematic views of cutting patterns according to the fourth embodiment;

DETAILED DESCRIPTION OF THE PREFERRED EMBODIMENTS

Preferred embodiments of the present invention will be described referring to FIGS. 1 to 22.

Figure 1:
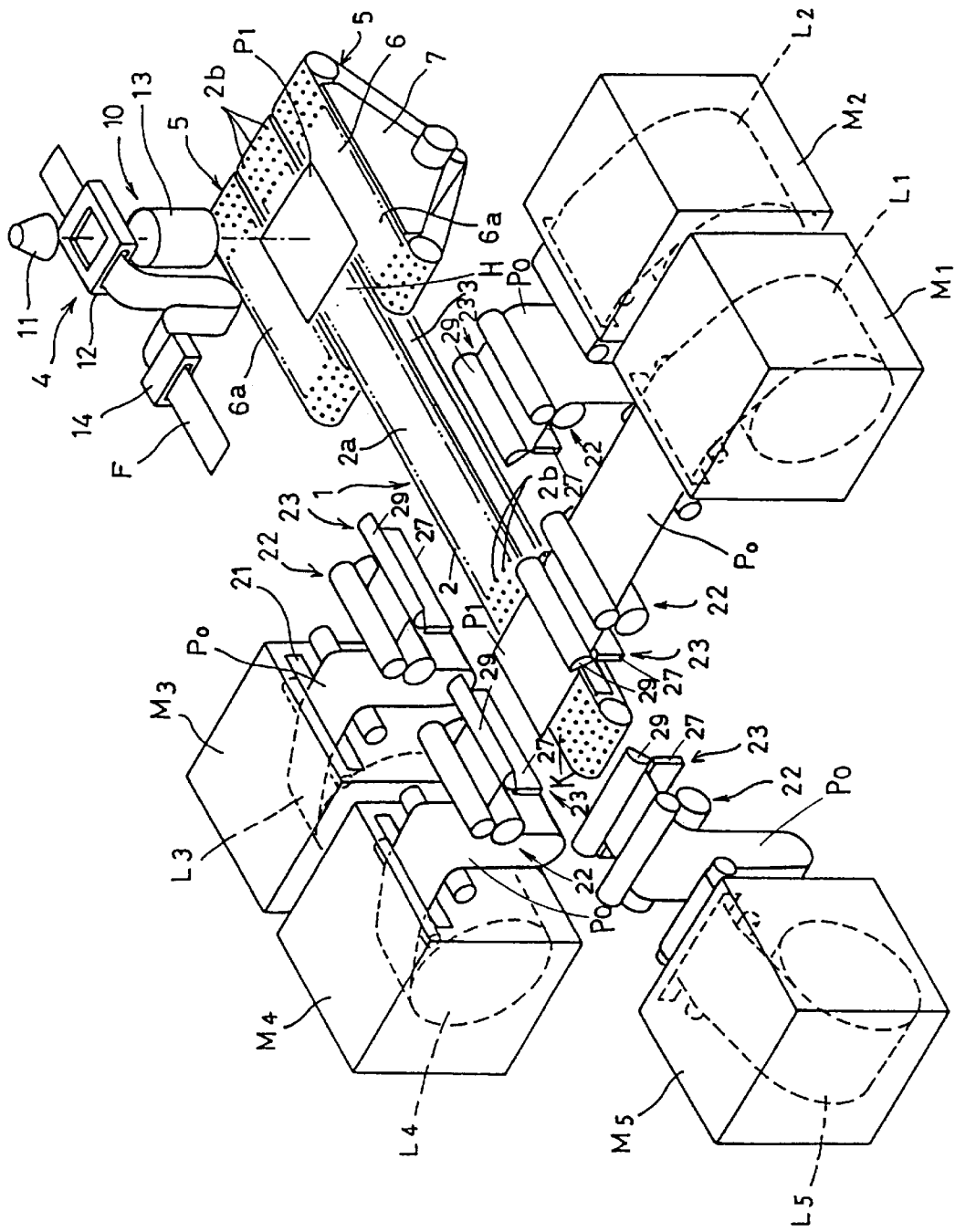
FIG. 1 is an overall perspective view showing a first embodiment of the present invention.
Figure 2:
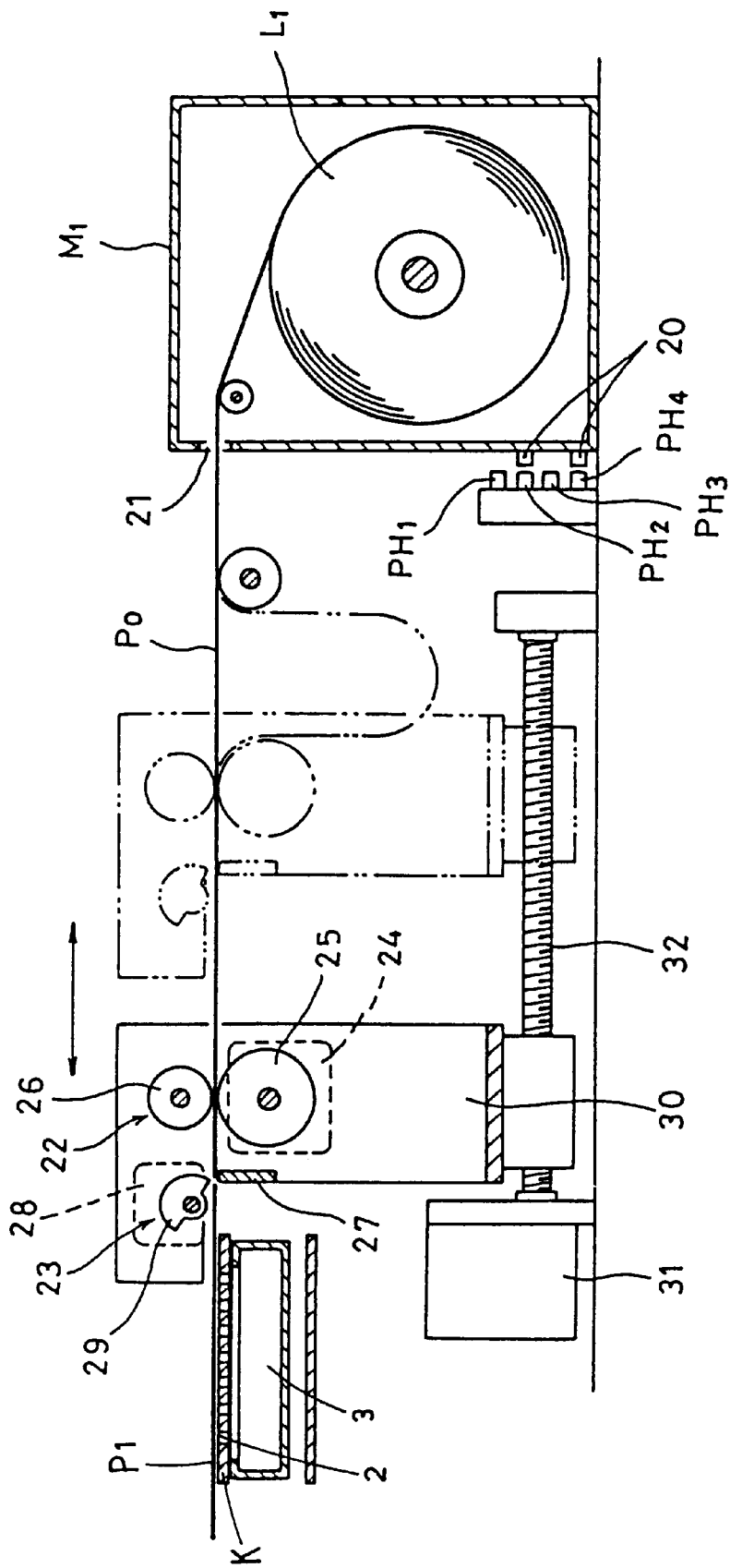
FIG. 2 is a cross sectional view of a paper magazine in the first embodiment.
Figure 3:
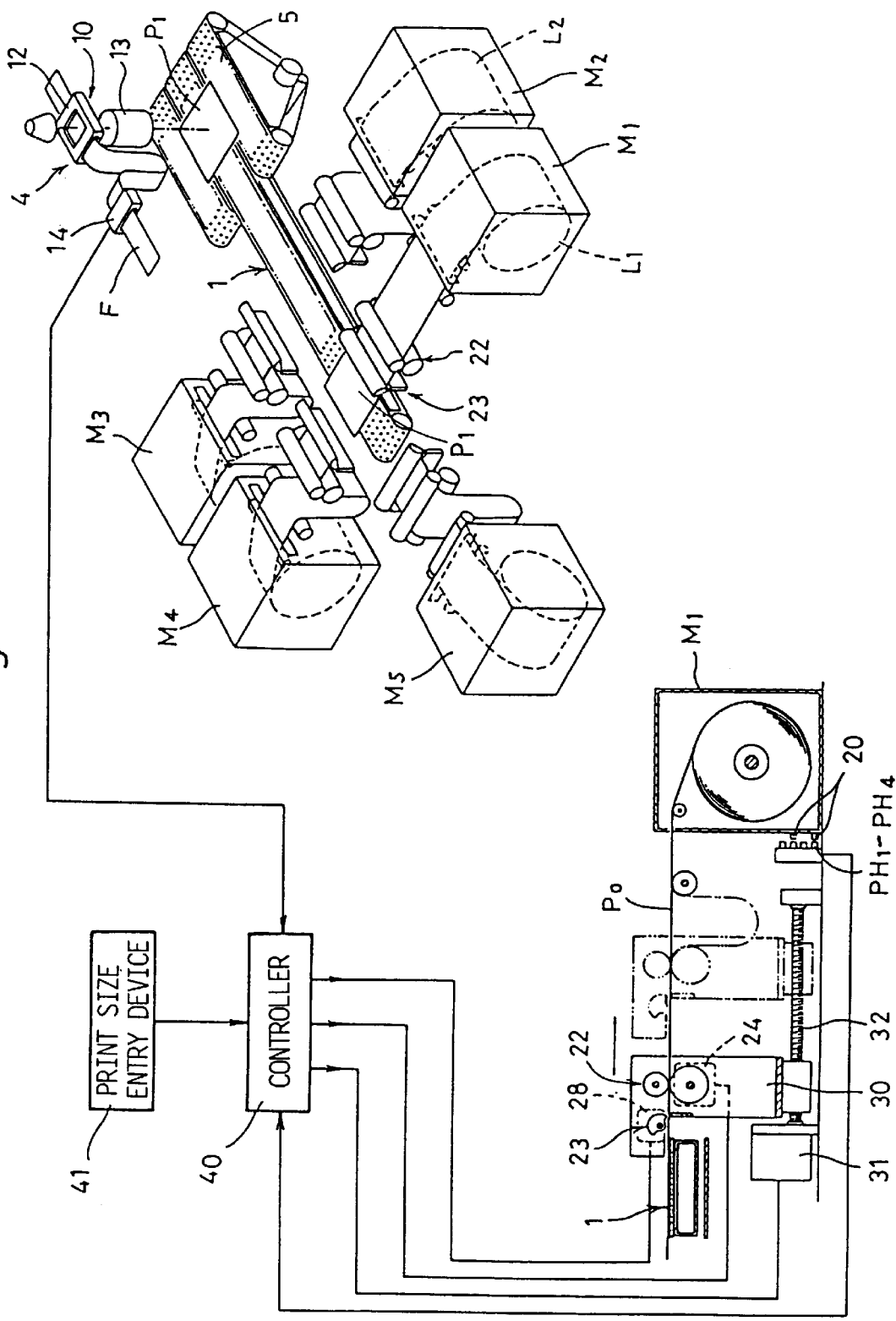
FIG. 3 is a block diagram of a controller device according to the first embodiment.

FIGS. 1–3 illustrate a first embodiment of the present invention. As shown in FIG. 1, a paper conveyor 1 includes an endless belt 2 having a multiplicity of apertures 2b and a suction box 3 disposed beneath a carrying side or upper run 2a of the belt 2. In the paper conveyor 1, a suction force produced by the suction box 3 is applied through the apertures 2b of the belt 2 to hold each cut paper P1 supplied to a loading end K of the carrying side belt 2a. As the belt 2 runs, the cut paper P1 is transferred to an exposure station 4.

Two sub paper conveyors 5 are disposed on both sides of an unloading end H of the paper conveyor 1. Each sub-paper conveyor 5 like the paper conveyor 1 includes a perforated endless belt 6 and a suction box 7 disposed beneath a carrying side 6a of the belt 6. The belt 6 of the sub paper conveyor 5 is arranged to run at the same speed and in the same direction as of the belt 2 of the paper conveyor 1.

The exposure station 4 includes an exposure unit 10 for printing images from a negative film F onto cut papers P1.

In operation, an image from the film F held in an automatic negative film mask 12 is irradiated by a light source 11 and projected through a printing lens 13 onto a cut paper P1 located at the exposure station 4. An image size sensor 14 is provided across a transfer path of the film F to the automatic negative film mask 12 for detection of the size of images.

There are a group of paper magazines M1 to M5 disposed adjacent to the loading end K of the paper conveyor 1, i.e. in a cluster arrangement around end K. The number of the paper magazines may be determined arbitrarily although it is five, M1 to M5, in the first embodiment. The paper magazines M1 to M5 contain five different width paper rolls L1 to L5 respectively.

Each of the paper rolls L1 to L5 Ls identified by a set of width sensors PH1 to PH4 detecting multiple width pattern pins 20 mounted on the respective paper magazine, as shown in FIG. 2. More specifically, the width pattern pins 20 are detachably fitted into pin holes (not shown) provided in each of the paper magazines M1 to M5 so that their pattern indicates the corresponding paper roll with a specific width accommodated in the paper magazine.

The paper magazines M1 to M5 are located with supply openings 21 thereof facing the loading end of the paper conveyor 1. Each paper magazine is provided with a paper feeder 22 for feeding a paper strip P0 from the supply opening 21 and a paper cutter 23 for cutting the paper strip P0 into cut papers P1 of a given length.

As best shown in FIG. 2, each paper feeder 22 comprises a drive roller 25 driven by a motor 24 and a press roller 26 remaining urged toward the drive roller 25. A length of feeding of the paper strip P0 is detected by the distance of rotation of the drive roller 25. The means for detecting the feeding length is not limited to the above arrangement. The paper cutter 23 comprises a stationary knife 27 and a rotary knife 29 driven by a motor 28. The paper feeder 22 and the cutter 23 are mounted on a movable base 30 which is engaged with a lead screw 32 driven by a motor 31. As the lead screw 32 rotates, the movable base 30 is moved to and from the paper conveyor 1.

The motors 24, 28, and 31 for driving the paper feeder 22, the cutter 23, and the lead screw 32 respectively are controlled by a controller 40 shown in FIG. 3. The controller 40 is adapted to receive detection signals from the image size sensor 14 and the paper width sensors PH1 to PH4 and a command signal indicative of a desired print size from a print size entry device 41. The operation of the photographic material feeder apparatus of the first embodiment having the foregoing arrangement will now be explained.

The print sizes include E, L, 2E, 2L, HDTV, panorama, and other formats, and the photographic paper with a specific width corresponding to a desired one of the print sizes is selected. The paper magazines M1 to M5 are filled with their respective paper rolls L1 to L5 of different widths corresponding to a desired group of the print sizes. Each of the paper magazines M1 to M5 has thereon a set of the width pattern pins 20 arranged in a corresponding pattern for allowing its accommodated paper roll to be identified by the width sensors PH1 to PH4. As a desired print size has been registered to the print size entry device 41, the film F is loaded to the automatic negative mask 12 and its size is measured by the image size sensor 14. A resultant image size signal of the image size sensor 14 is transmitted to the controller 40 where it is compared with size data of the paper rolls L1 to L5 in their respective paper magazines M1 to M5. The controller 40 determines a print size which corresponds to an image size by combining print size data of the print size emitting device and an image size of the image size sensor 14. In case the print size is size E, a paper magazine accommodating a paper roll of size E print is selected by the controller 40. For example, if the paper magazine M1 accommodates a paper roll L1 of size E, the motor 31 of the movable base 30 provided at the paper supply opening 21 of the paper magazine M1 is operated by the controller 40 to transfer the movable base 30 toward the paper conveyor 1. After the movable base 30 is forwarded to a predetermined position, the motor 24 of the paper feeder is operated by the controller 40. By operation of the motor 24, paper P0 is fed out from the paper magazine M1. The motor 24 stops when a given length of the paper P0 has been fed out. At the same time, motor 28 of the cutter 23 is driven by the controller 40. The motor 28 rotates rotary knife 29 to cut the paper P0 into cut papers P1 of a size corresponding to a print size. The cut papers P1 of a given size fall down onto the feeding end K of the paper conveyor 1 and are transferred thereby toward the exposure station 4.

Every film F is detected by the image size sensor 14 and transferred in one direction at a predetermined pitch. Every time each film F stops, an image size is detected by the image size sensor 14 and input to the controller 40. The controller 40 upon receiving the image size signal from the image size sensor 14 selects a corresponding one of the paper rolls L1 to L5 in their respective magazines M1 to M5 for feeding a series of the cut papers P1 of a desired print size.

As a desired image in the film F detected by the image size sensor 14 is advanced and placed at an exposure location in the automatic negative mask 12, a cut paper P1 of the corresponding print size is transferred to its printing location beneath the mask 12 for exposure. Since the movable base 30 is moved toward the paper conveyor 1 and moved back to the stationary position after supplying the cut paper P1 onto the paper conveyor, a larger size of cut paper P1 fed out from another paper magazine would not interfere with the movable base 30.

According to the first embodiment, the exposure location in the automatic negative mask 12 is spaced by a given distance from the image size sensor 14 while a number of the cut papers P1 corresponding to the number of images throughout the given distance are loaded on the paper conveyor 1 for printing in sequence. It is also possible to feed a succeeding cut paper P1 to the paper conveyor 1 upon unloading of a current cut paper P1 which has been exposed to irradiation of an image.

Another photographic material feeder apparatus is shown in FIGS. 4 to 11 according to a second embodiment of the present invention.

Figure 4:
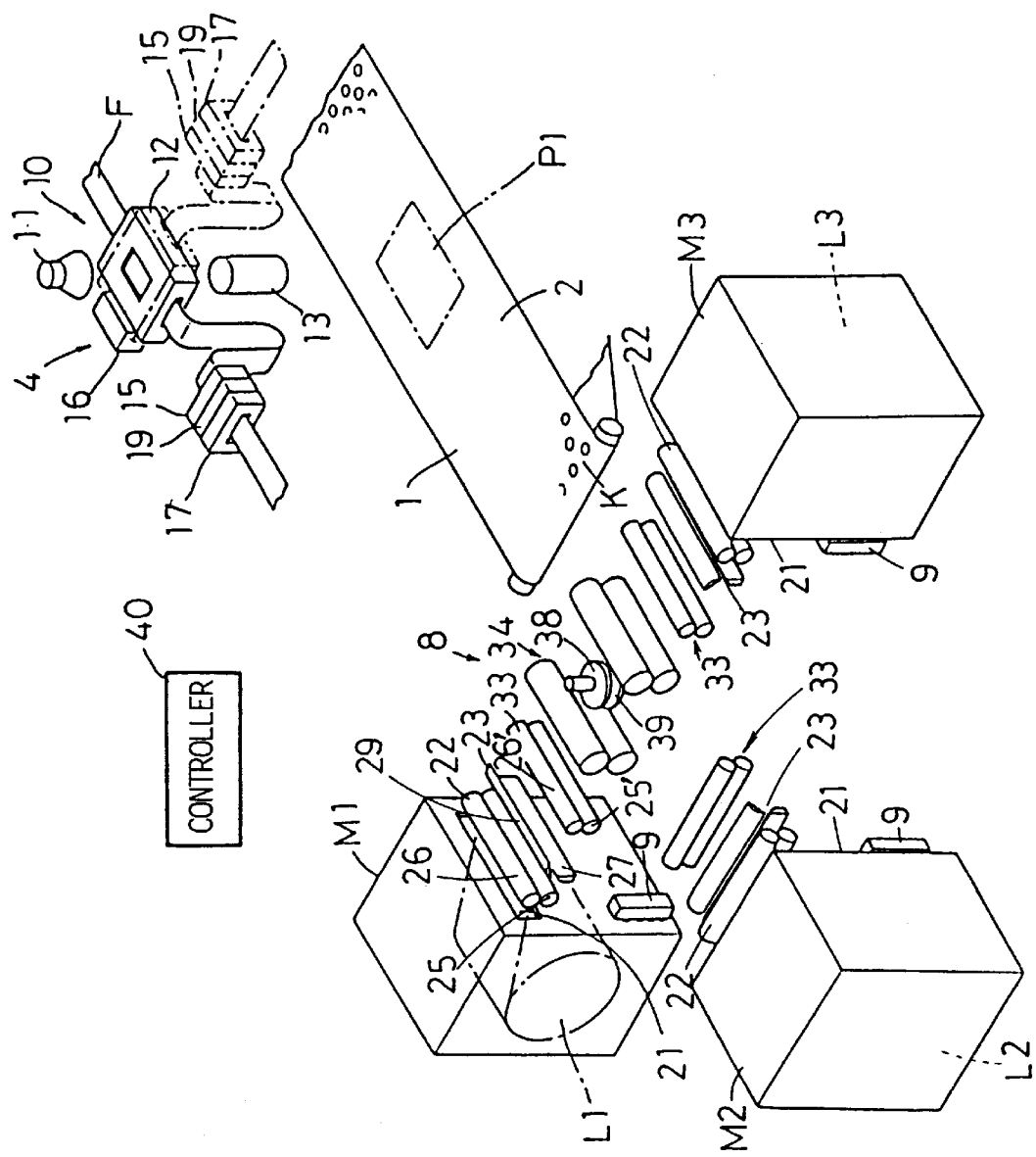
FIG. 4 is an overall perspective view showing a second embodiment of the present invention.

As shown in FIG. 4, the photographic material feeder apparatus comprises a paper conveyor 1, paper magazines M1 to M3, paper feeders 22, paper cutters 23, a paper transfer mechanism 8, and a controller 40. The photographic material feeder apparatus of the second embodiment is also coupled to an exposure station 4 in a photographic printer.

The paper conveyor 1 includes an endless belt 2 having a multiplicity of apertures and a suction box (not shown) disposed beneath a carrying side 2a of the belt 2. In the paper conveyor 1, a suction force produced by the suction box is applied through the apertures of the belt 2 to hold a cut paper P1 supplied to a loading end of the carrying side belt 2a. As the belt 2 runs, the cut paper P1 is transferred to the exposure station 4.

The exposure station 4 includes an exposure unit 10 disposed across the path of a negative film F. The exposure unit 10 comprises an exposure light source 11, an automatic negative film mask 12, and a printing lens 13. For printing, an image from the film F held in automatic negative film mask 12 is irradiated by light of the light source 11 and projected through the printing lens 13 onto a cut paper P1 placed in the exposure station 4.

In particular, the exposure station 4 is adapted to change the orientation of the film F relative to the paper conveyor 1 by shifting the direction of feeding the film F to the automatic negative mask 12 as denoted by the dotted lines in FIG. 4. This allows an image to be printed in a desired orientation onto the cut paper P1 transferred on the paper conveyor 1.

Figure 5A:
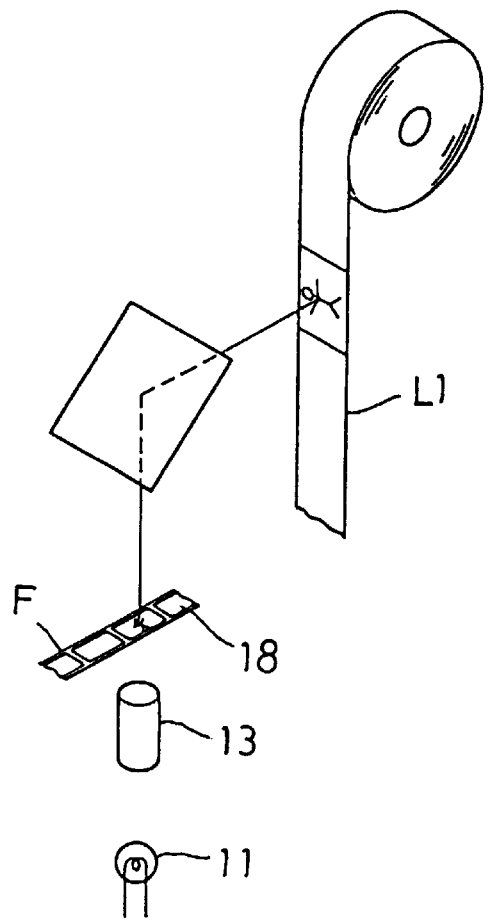
FIGS. 5(a) and 5(b) are perspective views showing printing operations according to the second embodiment.
Figure 5B:
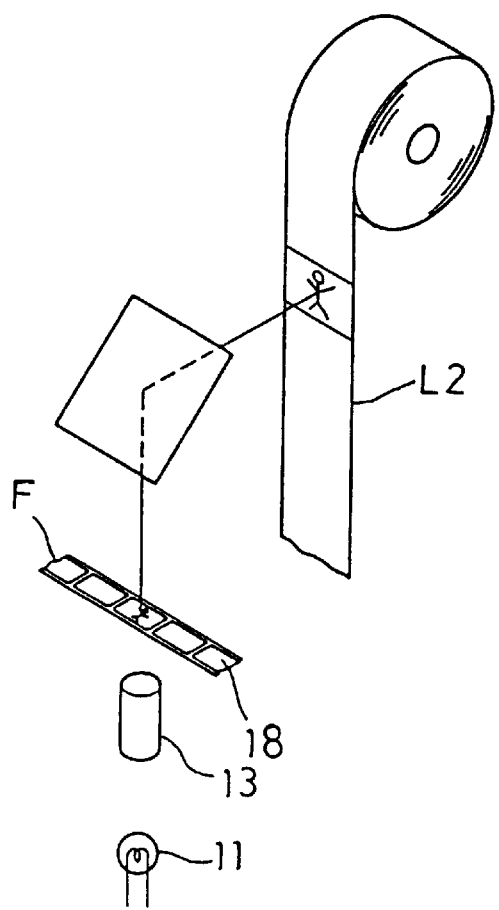
Figure 16A:
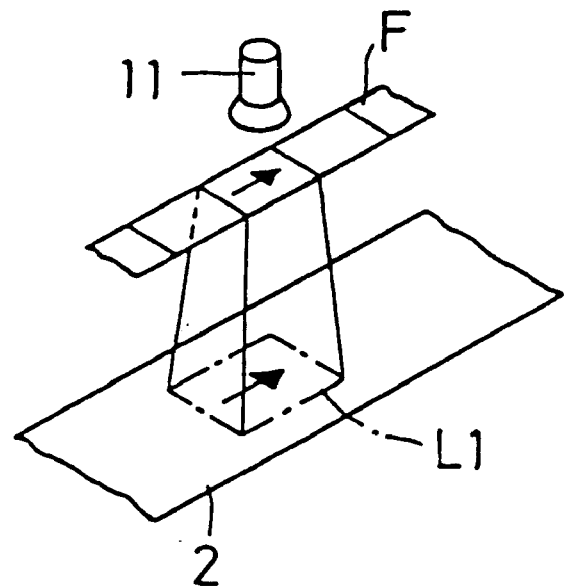
FIGS. 16(a) and 16(b) are perspective views of printing patterns according to the second and fourth embodiments.
Figure 16:
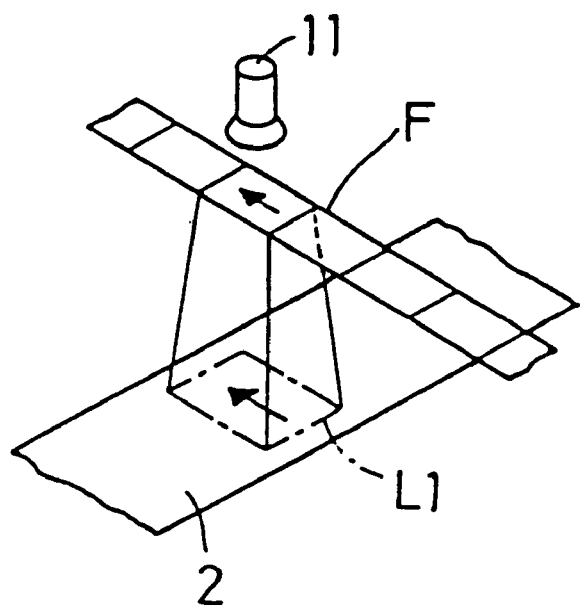

More specifically, frame images in the film F can be printed by two methods, i.e. longitudinal printing for printing the images onto paper strip L1 which is identical in width to the images to be printed and arranged in parallel with the film F, as shown in FIGS. 5(a) and 16(a), and transverse printing for printing the images onto paper strip L2 which has a width identical to the length of the images and is arranged at a right angle to the film F, as shown in FIGS. 5(b) and 16(b) (cf. a half size negative is printed by the transverse manner as it is extended lengthwisely). The exposure station 4 of the second embodiment allows the automatic negative mask 12 with the film F to be shifted in orientation to match the different widths of the paper rolls L1 to L3.

For such purpose, the automatic negative mask 12 is provided with a film direction detector 16 which detects the direction of the automatic negative mask 12, as shown in FIG. 4. As the direction of feeding the film F is detected, it is determined whether the exposure station 4 is ready for longitudinal or transverse printing.

Also, there are mounted across the path of the film F a film type detector 17 for detecting the type of the film F by reading the sensitivity of the film F, an image size detector 19 for determining whether a frame 18 in the film F is a full size, a half size, an HDTV size, or a panorama size, and a magnetic data reader 15 acting as image size detecting means for reading various data, including an image size, which are recorded and stored on a magnetic medium region of the film.

The paper magazines M1 to M3 are arranged about the paper transfer mechanism 8 located in the rear of a supply end K of the paper conveyor 1. Although the second embodiment provides three of the paper magazines M1 to M3 containing paper rolls L1 to L3 respectively which are different in width, the number of the magazines is not limited to three and may be four or more.

Each of the paper magazines M1 to M3 has a supply opening 21 provided in the front thereof and coupled to a paper feeder 22 for feeding out the leading end of the paper strip from the magazine and a paper cutter 23 for cutting the paper strip into cut papers P1 of a given length. The paper feeder 22 comprises a drive roller 25 driven by a motor and a press roller 26 remaining urged toward the drive roller 25. The rollers may be coupled with a rotary encoder which measures a feeding length of the paper strip L1 (L2 or L3). The means for detecting the feeding length is not limited to the above arrangement. The paper cutter 23 comprises a stationary knife 27 and a rotary knife 29 driven by a motor (not shown). As the paper strip L1 is advanced by the paper feeder 22, it is cut by the rotating action of the rotary knife 29 to produce a cut paper P1.

Figure 6:
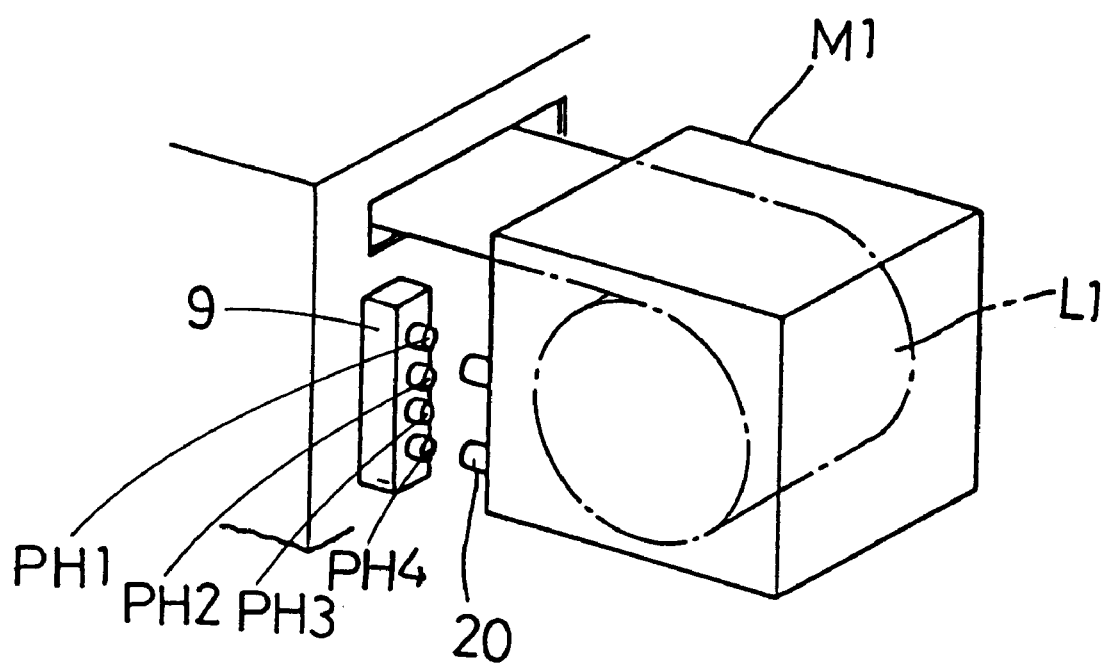
FIG. 6 is a perspective view of a paper width detector in the second embodiment.

Each of the paper magazines M1 to M3 is equipped with a paper width detector 9. The paper width detector 9 comprises width pattern pins 20 detachably mounted to the paper magazine and width sensors PH1 to PH4 mounted to a paper magazine mounting base, as shown in FIG. 6. As the sensors PH1 to PH4 detect a pattern of the pins 20, the width of the paper roll accommodated in the paper magazine M1 is identified. For example, as shown in FIG. 7, five different widths of paper rolls ranging from 152 mm to 83 mm are represented by respective patters of four of the width pattern pins 20.

The paper transfer mechanism 8 comprises intermediate transfer units 33 and a paper rotation unit 34, as shown in FIG. 4. The intermediate transfer unit 33 comprises a drive roller 25' driven by a motor (not shown) and a press roller 26' disposed directly on the drive roller 25'. The intermediate transfer unit 33 is located between the paper cutter 23 and the paper rotation unit 34 for transferring the cut paper P1 separated by the cutter 23 from the paper strip of each magazine to the paper rotation unit 34.

Figure 8:
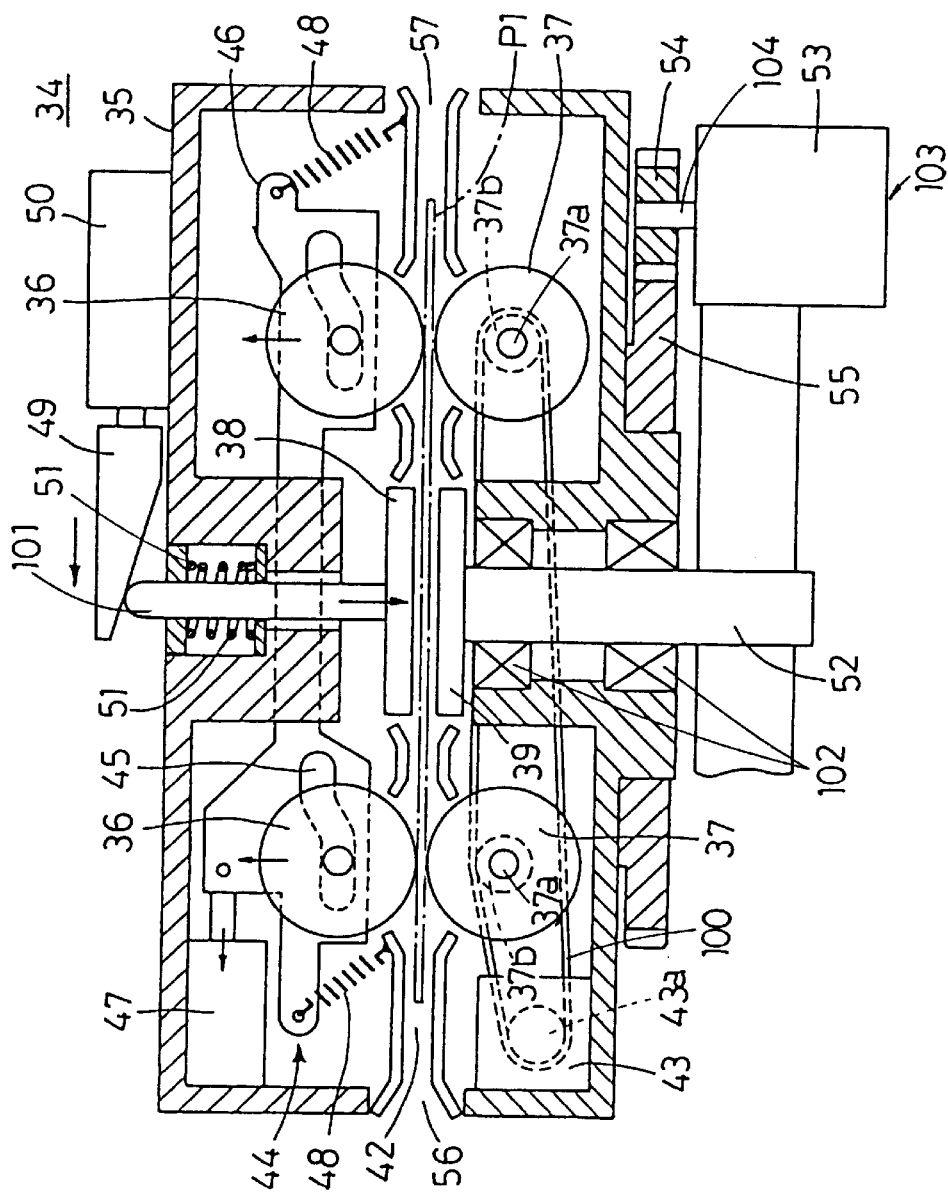
FIG. 8 is a cross sectional view of a paper turntable in the second embodiment.

The paper rotation unit 34 comprises sets of transfer rollers 36 and 37 mounted in a rotation frame 35 and a pair of disks 38, 39, as shown in FIG. 8. The rotation frame 35 has therethrough a transfer path 42 for the cut paper P1. The sets of the transfer rollers 36 and 37 are arranged along the path 42. In each set, the transfer rollers 36 and 37 serve as a press roller 36 and a drive roller 37, respectively, located on opposite sides of the transfer path 42. The drive roller 37 has a pulley 37b mounted on a rotary shaft 37a thereof. The pulleys 37b of the drive rollers 37 are linked by a belt 100 to a motor pulley 43a mounted on a drive shaft of a motor 43. Also, a rotary encoder (not shown) is mounted to the drive shaft of the motor 43 for detecting the distance of feeding of the cut paper P1.

The press rollers 36 are controlled with a pressure release device 44 which comprises a release cam 46 having cam slots 45 therein, a solenoid 47 provided for actuating the release cam 46 in a horizontal direction, and springs 48 urging the release cam 46 against the actuating force of the solenoid 47, as shown in FIG. 8. More specifically, shafts of the press rollers 36 are accepted in respective cam slots 45 of the release cam 46 so that when the release cam 46 is actuated by the solenoid 47 in the direction denoted by the arrow, the press rollers 36 move upwards along the cam slots 45, thus to depart from the drive rollers 37. When the solenoid 47 is switched off, the release cam 46 remaining urged by the force of the springs 48 allows the press rollers 36 to move downward along the cam slots 45 and sit on respective drive rollers 37.

The disks 38 and 39 are located on opposite sides of the transfer path 42 and at the center of the frame 35. The upper disk 38 is coupled to a shaft 101 which vertically extends through the frame 35 to a press cam 49. The press cam 49 has a tapered shape and is mounted to a press solenoid 50. A compression spring 51 is mounted around the shaft 101. When the press cam 49 is advanced by the action of the press solenoid 50, it presses down the shaft 101. As a result, the upper disk 38 is moved downward to come into contact with the lower disk 39. When the press solenoid 50 is deenergized, the compression spring 51 lifts up the shaft 101 and the press cam 49 retracts. Accordingly, the upper disk 38 is released from direct contact with the lower disk 39.

The lower disk 39 is mounted to the uppermost end of a shaft 52 vertically extending through a lower portion of the rotation frame 35. More particularly, the shaft 52 is rotatably mounted by bearings 102 to the rotation frame 35. The rotation frame 35 is actuated by a rotation device 103 for rotation about shaft 52. The rotation device 103 includes a toothed wheel 54 mounted to amounted to a drive shaft 104 of a motor 53. The toothed wheel 54 is in mesh with a toothed wheel 55 mounted to the lowermost portion of the rotation frame 35 outwardly of the bearings 102 so that the rotation frame 35 can be rotated by the motor 53. The rotation device 103 is also equipped with a rotary encoder (not shown) which acts as a rotation sensor and is linked with the toothed wheel 55 mounted outwardly of the bearings 102 for detecting the rotating movement of the rotation frame 35.

In operation, the motor 53 of the paper rotation unit 34 is actuated to turn the rotation frame 35 so that an input end 56 of the transfer path 42 faces a desired one of the paper magazines M1, M2, and M3 (as its location is determined by the rotary encoder). The press solenoid 50 is deenergized allowing the upper disk 38 to move upward. When the press cam 49 has been retracted, the motor 43 is turned on to rotate the rollers 36 and 37 for receiving a cut paper P1 from the respective intermediate transfer unit 33 (See FIG. 4). As the cut paper P1 is infed and placed between the disks 38 and 39, the rotation of the rollers 36 and 37 is stopped. Then, the motor 53 is switched on to turn the rotation frame 35 so that an output end 57 of the transfer path 42 faces the paper conveyor 1. When the rollers 36 and 37 again are actuated, the cut paper P1 is discharged and transferred to the loading end K of the paper conveyor 1.

More specifically, before shifting the transfer direction of the cut paper P1 by 90 degrees, the press solenoid 50 is actuated to advance the press cam 49 which in turn lowers and presses the upper disk 38 against the lower disk 39 to hold the cut paper P1. Then, the solenoid 47 is actuated to move the release cam 46 for releasing the pressing action of the press rollers 36. The rotation frame 35 with the Cut paper P1 is then turned to 90 degrees by the action of the motor 53 and the solenoid 47 is turned off. The release cam 46 returns to its press position by the action of the springs 48 allowing the press rollers 36 to press against the drive rollers 37. Simultaneously, the press solenoid 50 is deenergized to allow upward movement of the upper disk 38 for releasing the cut paper P1. As the output end 57 of the rotation frame 35 has been positioned by the motor 53 to face the paper conveyor 1, the motor 43 is turned on for actuating the rollers 36 and 37. As a result, the cut paper P1 is discharged and loaded onto the transfer conveyor 1.

According to the second embodiment, the three paper magazines M1 to M3 are arranged about the paper transfer mechanism 8 and at the loading end K of the paper conveyor 1, one behind the transfer mechanism 8 and two on opposite sides of the conveyor 1. The paper magazines M1 to M3 contain three different width paper rolls L1 to L3, respectively, a 2E format paper roll 117 mm wide shown in (i) of FIG. 10 (c), a 2L format paper roll 127 mm wide shown in (i) of FIG. 10 (d), and a HDTV/panorama compatible paper roll 89 mm wide shown in (i) of FIG. 10 (e) or 10 (f). It will now be explained how E, L, 2E, 2L, HDTV, and panorama sizes of cut papers P1 are produced by the apparatus of the second embodiment from the three paper rolls L1 to L3 regardless of the full or half size of an image from the film F.

The three paper magazines M1 to M3 accommodating their respective paper rolls L1 to L3 are placed in positions with the width pattern pins 20 thereof preset for allowing the controller 40 to identify the width size of the paper rolls L1 to L3.

When the film F is loaded and the size of a desired print is entered, the transfer of the film F to the automat ic negative mask 12 is commenced. While the film F is transferred, its frame size is detected by the image size detector 19. More specifically, it is determined whether the frame in the film F is a full size or a half size. If full size is detected, it is then examined whether the size is an HDTV or panorama format. Simultaneously, the orientation of the automatic negative mask 12 is examined by the film feeding direction detector 16 to determine whether it is set for longitudinal or transverse printing at the exposure station 4. Resultant detection signals are sent to the controller 40 which in turn selects a corresponding paper from the paper rolls L1 to L3 of respective magazines M1 to M3.

It should be noted that the paper roll for transverse printing of E format sizes shown in FIG. 10 (a) is identical in width to the paper roll for longitudinal printing of 2E format sizes shown in FIG. 10 (c). Similarly, the paper roll for transverse printing of L format sizes shown in FIG. 10 (b) is identical in width to the paper roll for longitudinal printing of 2L format sizes shown in FIG. 10 (d). The two rolls for longitudinal printing of HDTV format sizes and of panorama format sizes are equal to each other in width as shown in FIGS. 10 (e) and 10 (f).

The controller 40 hence selects the 2E size paper roll L1 in the magazine M1 regardless of the full or half size when the print size is desired to be of E or 2E format. If the L or 2L size is desired, the paper roll L2 in the magazine M2 is selected regardless of the full or half image size in the film F. When the image size detector 19 detects an image of HDTV or panorama size in the film F, the 89 mm wide paper roll L3 in the magazine M3 is selected for printing.

The paper transfer mechanism 8 then actuates the paper rotation device 34 for turning the rotation frame 35 so that the input end 56 faces a desired one of the paper magazines M1 to M3. The leading end of the paper roll L1, L2, or L3 is drawn out from the magazine by the paper feeder 22 and cut by the paper cutter 23 into the cut papers P1 of a desired length. The cutting length is 82.5 mm for E format size, 165 mm for 2E format size, 89 mm for L format size, and 178 mm for 2L format size. As shown in FIGS. 10 (e) and 10 (f), the length is 158 mm for HDTV format and 254 mm for panorama format.

The controller 40 then actuates the intermediate transfer unit 33 for feeding the cut papers P1 to the paper rotation device 34. Simultaneously, the press solenoid 50 of the paper rotation device 34 is deenergized for releasing the pressing action of the press cam 49. As the upper disk 38 has moved upward, the motor 43 is switched on for driving the rollers 36 and 37 to receive the cut paper P1. After the cut paper P1 is accepted, the motor 53 is turned on for actuating the rotation frame 35 to direct the output end 57 of its transfer path 42 towards the paper conveyor 1. The rotating movement of the rotation device 34 with the cut paper P1 is controlled by the controller 40 actuating in response to feeding direction data from the film feed direction detector 16 for printing at the exposure station 4 and image size data from the image size detector 19. Accordingly, the direction of the cut paper P1 for feeding to the loading end K of the paper conveyor 1 is determined.

It is now assumed that in a first printing operation, longitudinal printing is required at the exposure station 4, the paper size is of E and L formats, and the full size of images is to be printed. When the paper rolls L1 and L2 for 2E and 2L formats are supplied and the film F is fed as shown in FIG. 11 (a), the controller 40 operates 90-degree turning of the cut papers P1 before loading to the paper conveyor 1 for printing a series of E and L format sizes as shown in (ii) of FIG. 10 (a) and (ii) of FIG. 10 (b). More particularly, the controller 40 turns on the press solenoid 50 to advance the press cam 49. As the upper disk 38 is pressed against the lower disk 39, the press rollers 36 are lifted up by the action of the cam solenoid 47. The motor 53 is then switched on for turning the rotation frame 35 by 90 degrees. Then, the cam solenoid 47 is switched off to lower the press rollers 36 to the drive rollers 37 and the press solenoid 50 is deenergized to allow the upward movement of the upper disk 38 for releasing the cut paper P1. After the output end 57 of the rotation device 34 is shifted by the action of the motor 53 towards the paper conveyor 1, the rollers 36 and 37 are driven to load the cut paper P1 onto the paper conveyor 1.

In a second printing operation, longitudinal printing is required at the exposure station 4, the paper size is of E and L formats, and the half size of images is to be printed. The film F is as shown in FIG. 11 (b) where two half size images are assigned to one frame. As each image is carried transversely of the film F, the cut paper P1 need not be turned 90 degrees before loading to the paper conveyor 1. In operation, upon the press solenoid 50 being deenergized to allow release movement of the upper disk 38, the transfer rollers 36 and 37 are driven to discharge the cut paper P1 directly.

In a third printing operation, longitudinal printing is required at the exposure station 4, the paper size is of 2E, 2L, HDTV, and panorama formats, and both full and half sizes of images are to be printed. When the film F of full size images is loaded as shown in FIG. 11 (c), it can be printed directly. Hence, the cut papers P1 are transferred to the paper conveyor 1 without turning 90 degrees. If the film F carries half size images, the cut papers P1 have to be turned by 90 degrees before being loaded to the conveyor 1.

In a fourth printing operation, transverse printing is required at the exposure station 4, the paper size is of E and L formats, and full size images are to be printed. The film F of full size images is loaded as shown in FIG. 11 (d) for transverse printing. While series of the E and L format sizes appear as shown in (ii) of FIG. 10 (a) and (ii) of FIG. 10 (b), the cut papers P1 need not be turned by 90 degrees.

In a fifth printing operation, transverse printing is required at the exposure station 4, the paper size is of E and L formats, and half size images are to be printed. The film F of half size images is loaded as shown in FIG. 11 (e) for transverse printing. As the half size image is oriented at a right angle to the full size image, the cut papers P1 have to be turned by 90 degrees before being loaded to the paper conveyor 1.

In a sixth printing operation, transverse printing is required at the exposure station 4, the paper size is of 2E, 2L, HDTV, and panorama formats, and both full and half size images are to be printed. The film F of full size images is loaded as shown in FIG. 11 (d) for transverse printing. While series of the different format sizes appear as shown in (i) of FIG. 10 (c), (i) of FIG. 10 (d), (i) of FIG. 10 (e), and (i) of FIG. 10 (f), the cut papers P1 have to be turned by 90 degrees before being loaded to the paper conveyor 1.

When the film F carries half size images as shown in FIG. 11 (f), the print can be made in the same direction. Hence, the cut papers P1 need not be turned 90 degrees before being loaded to the conveyor 1.

In operation, the film F is intermittently fed in one direction by a given length of pitch determined by the image size detector 19. While the image detected by the image size detector 19 is fed to the exposure location in the automatic negative mask 12, the cut paper P1 of a corresponding size is also conveyed beneath the exposure location for printing. By repeating the above procedure, a succession of the cut papers P1 are transferred to the exposure station 4.

As set forth above, the apparatus of the second embodiment allows cut papers P1 of twelve different sizes to be prepared from the three paper rolls L1 to L3 corresponding to two, full and half, sizes of each frame and six print sizes of E, L, 2E, 2L, HDTV, and panorama formats.

Figure 12:
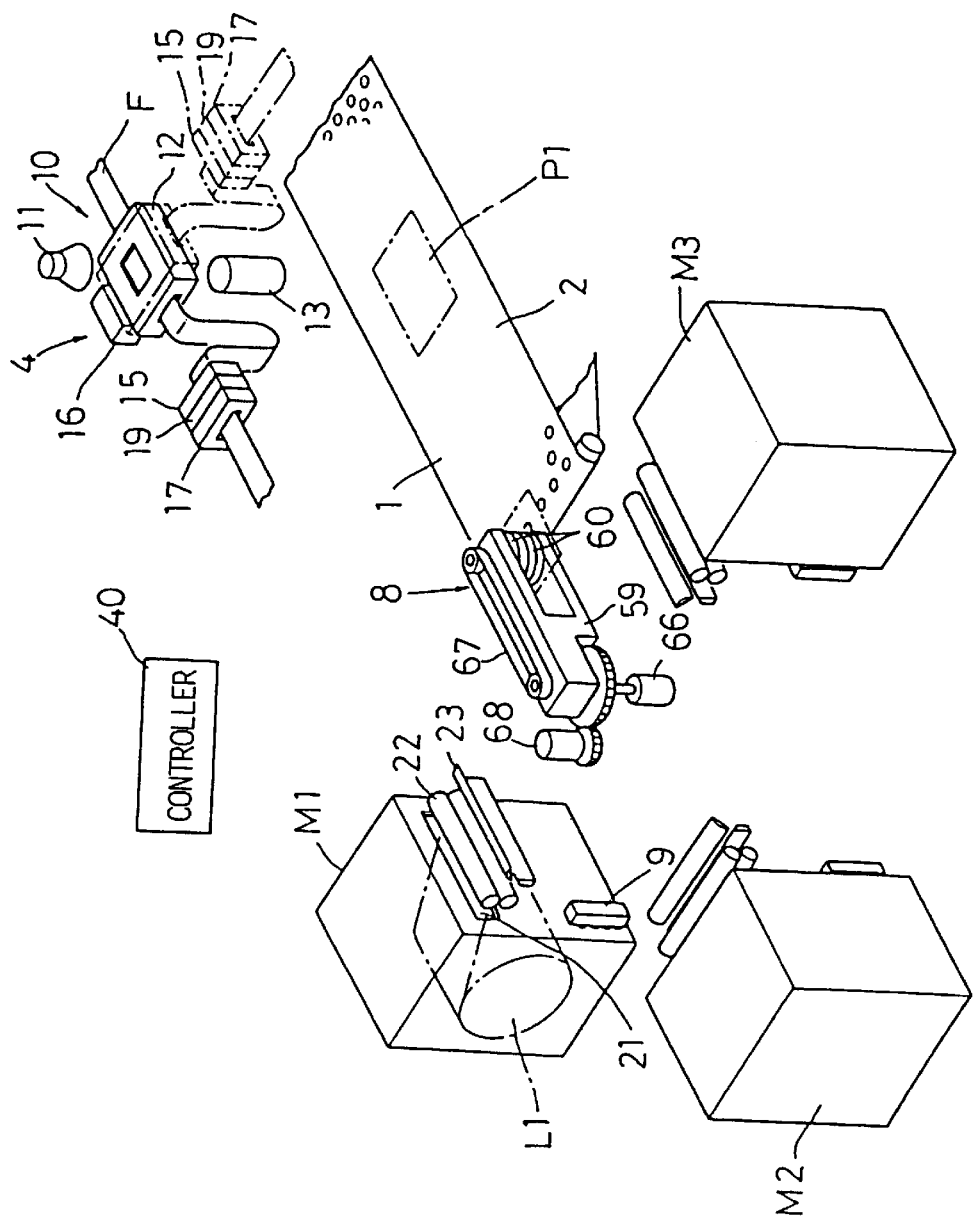
FIG. 12 is an overall perspective view showing a third embodiment of the present invention.
Figure 13:
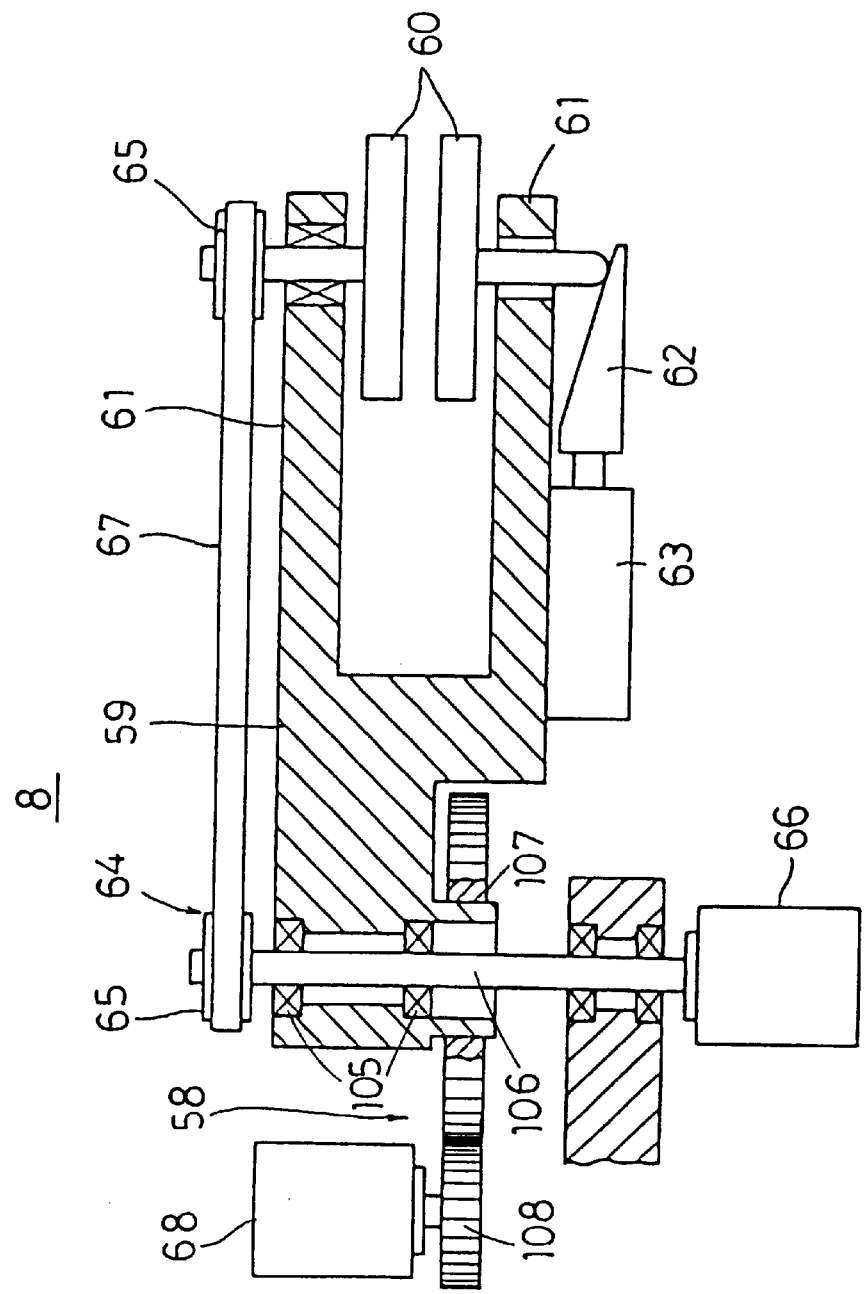
FIG. 13 is a cross sectional view of a paper transfer device of the third embodiment.
Figure 14:
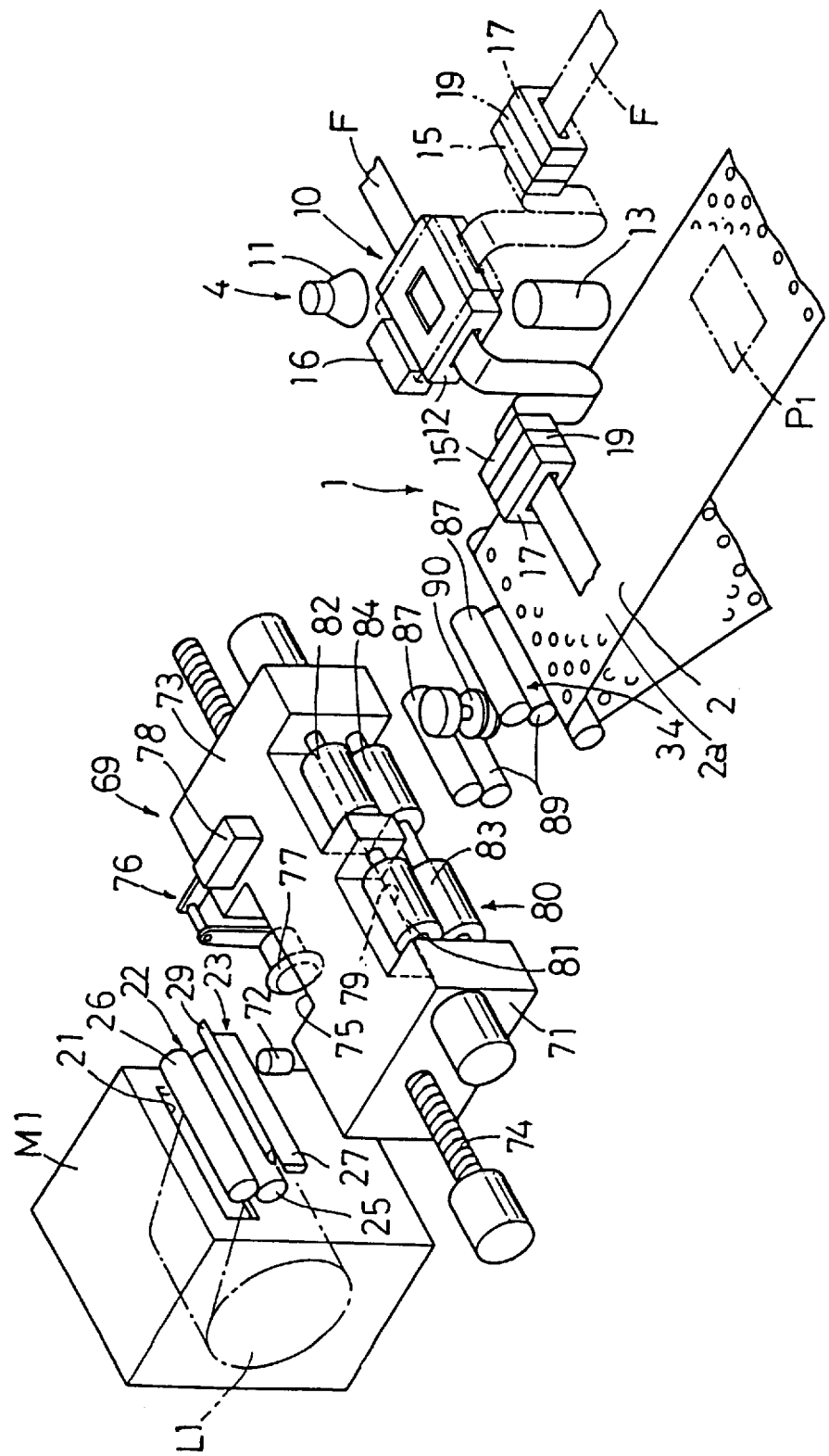
FIG. 14 is an overall perspective view showing a fourth embodiment of the present invention.

FIG. 12 illustrates a third embodiment of the present invention. In this embodiment, the intermediate transfer units 33 and the paper rotation unit 34 in the paper transfer mechanism 8 of the second embodiment are replaced by a transfer mechanism 8 including an arm actuator 58, an arm 59 coupled at a first end thereof to the arm actuator 58 for pivotal movement, and a pair of disks 60 mounted to a second end of the arm 59 for receiving and holding a cut paper P1 from the paper cutter 23. As best shown in FIG. 13, the arm 59 of the modified paper rotation mechanism 8 is mounted at the first end thereof by bearings 105 to the arm actuator 58 for pivotal movement. The second end of the arm 59 has two, upper and lower, support portions 61 through which extend two shafts of respective disks 60 for rotation. The shaft of the lower disk 60 is directly supported at the lower-most end by a press cam 62 of a tapered shape. The press cam 62 is coupled to a solenoid 63 mounted to the lower support portion 61 of the arm 59. When the solenoid 63 is energized, the press cam 62 lifts up the lower disk 60 until it comes into contact with the upper disk 60. The deenergization of the solenoid 63 causes the lower disk 60 to depart from the upper disk 60. The upper disk 60 is driven by a disk drive 64 which comprises two toothed pulleys 65, one mounted to the shaft of the upper disk 60 and the other mounted to a drive shaft 106 of a motor 66 extending through the first end of the arm 59, and a timing belt 67 mounted between the two pulleys 65 for rotation of the upper disk 60. The drive shaft 106 of the motor 66 is provided with a rotary encoder (not shown) for detecting the angle of rotation of the disk 60. The arm actuator 58 comprises a gear 107 mounted to the first end of the arm 59 and a gear 108 provided in mesh with the gear 107. Similar to the disk drive 64, a rotary encoder (not shown) is mounted to the drive shaft of a motor 68 for detecting the angle of rotation of the arm 59.

Figure 9:
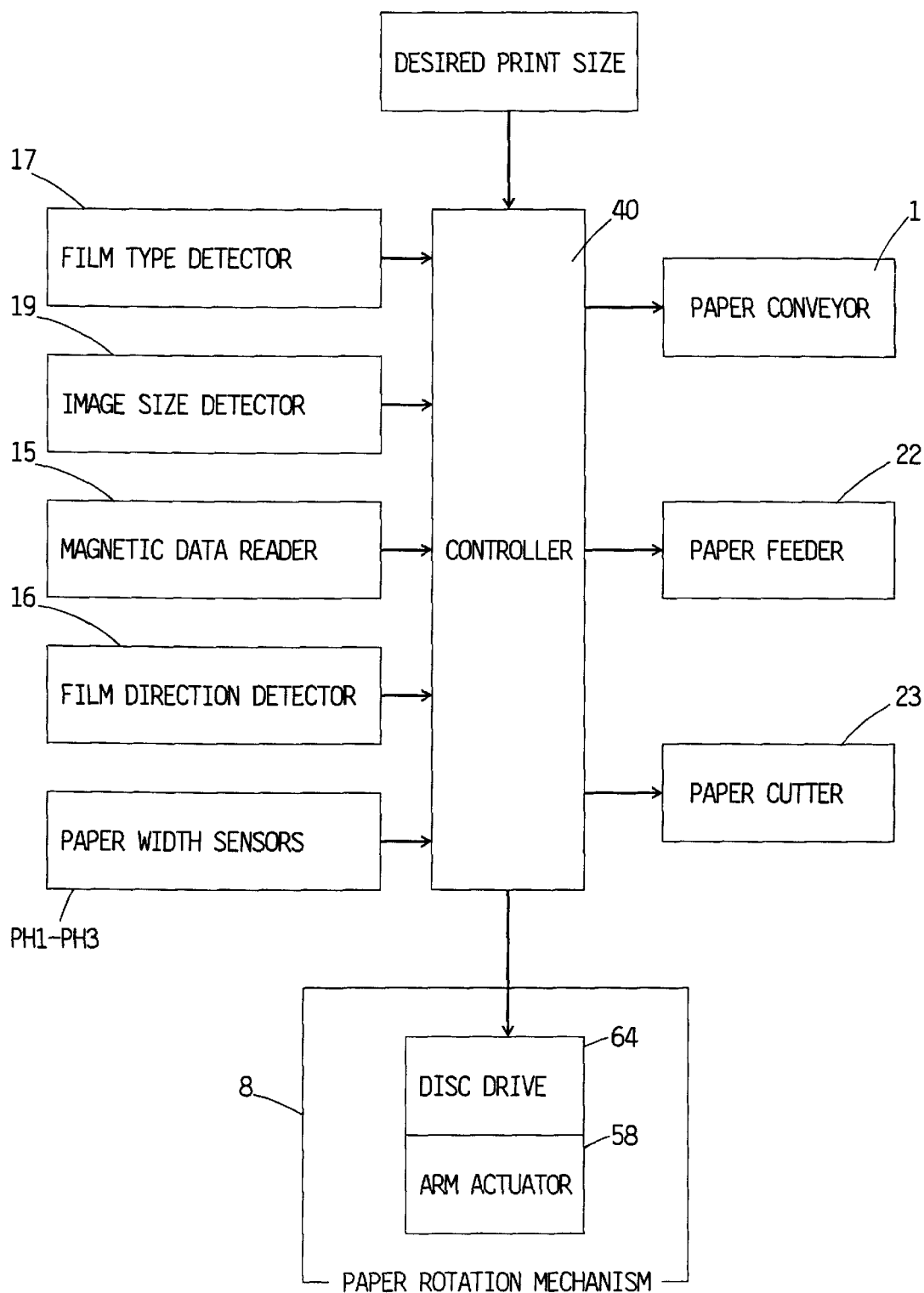
FIG. 9 is a block diagram of a controller device according to the invention.
Figure 11A:
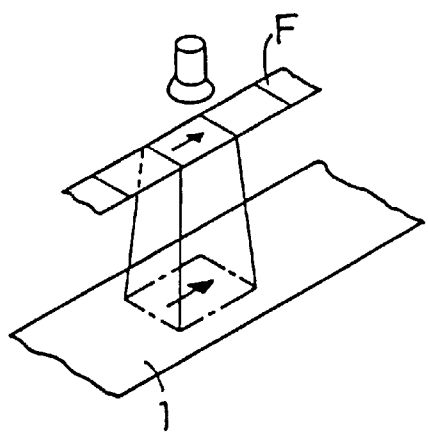
FIGS. 11 (a)–11 (f) are perspective views showing control of rotation in the second embodiment.
Figure 11B:
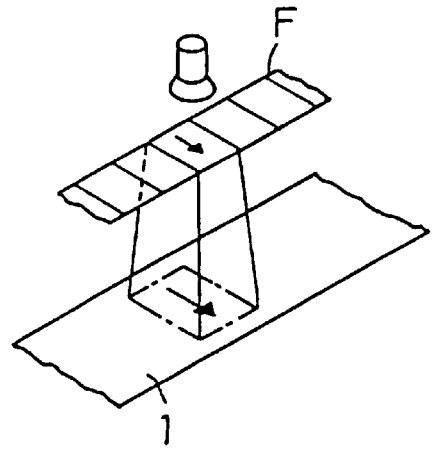
Figure 11C:
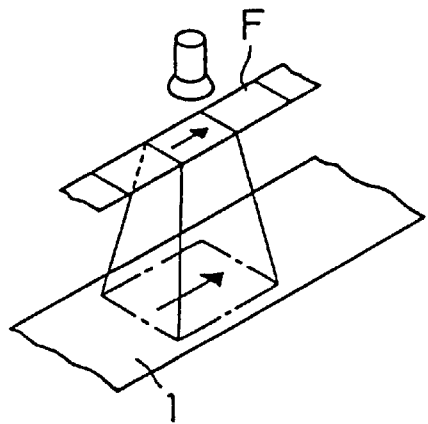
Figure 11D:
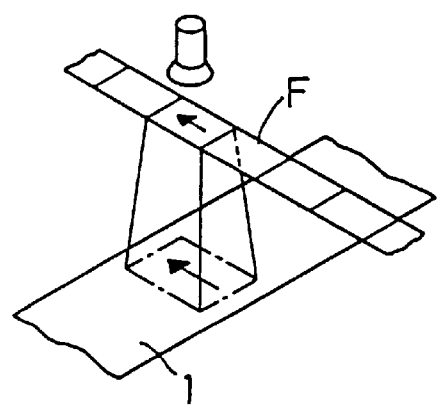
Figure 11E:
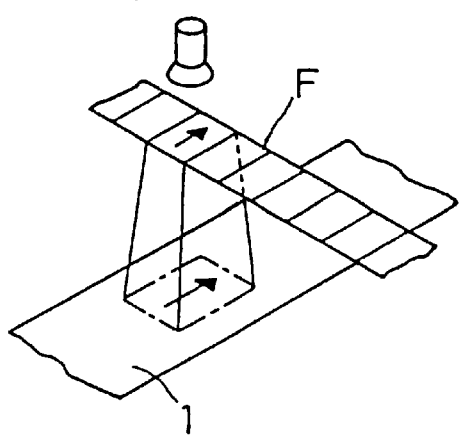
Figure 11F:
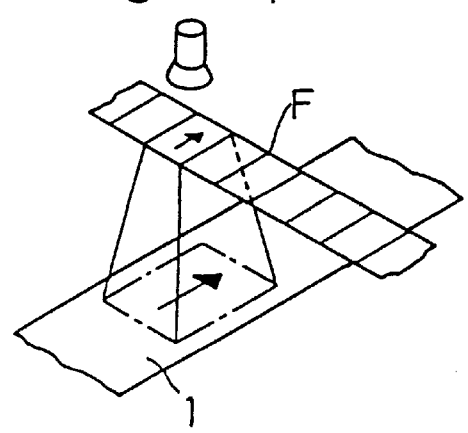

As shown in FIG. 9, the controller 40 is connected to the detectors and sensors 16, 17, 19, 15, and PH1 to PH4 and to the encoders and also is arranged to receive various setting data of desired print sizes associated with the paper rolls L1 to L3. In response to such data, the controller 40 controls the actions of the paper feeders 22 and cutters 23 of the respective paper magazines M1 to M3 and of the paper transfer mechanism 8 to load the cut paper P1 of a desired size to the paper conveyor 1.

In operation of the modified paper transfer mechanism 8, the controller 40 selects one of the paper rolls L1 to L3 in their respective magazines M1 to M3 which corresponds to the size of desired prints and then causes the arm actuator 58 to drive the arm 59 towards the respective paper magazine. After the disks 60 on the arm 59 are opened by the action of the solenoid 63, the leading end of the selected paper roll is fed out by the paper feeder 22 from the magazine. A given length of the paper is advanced and held between the two disks 60 by the pressing action of the solenoid 63 before being separated by the paper cutter 23. A separated portion or cut paper P1 from the cutter 23 is then loaded to the paper conveyor 1 by the action of the arm actuator 58. In the same manner as the second embodiment, as shown in FIG. 9, the controller 40 controls the rotation of the disks 60 through the disk drive 64 according to feeding direction data of the film feeding direction detector 16 at the exposure station 4 and image size data of the image size detector 19. Then, after the solenoid 63 is deenergized, the cut paper P1 is transferred to the paper conveyor 1. A succession of the papers can automatically be loaded to the conveyor 1 by repeating the above procedure. Control by the controller 40 over the rotation of the disks 60 will not be explained in more detail as it is similar to that described with respect to the second embodiment.

FIGS. 14 to 19 illustrate a fourth embodiment of the photographic material feeder apparatus.

The photographic material feeder apparatus of the fourth embodiment includes a processing means 69 disposed between the paper magazine M1 and the paper conveyor 1. The three units M1, 1, and 69 are controlled by a controller 70 shown in FIG. 17. The paper magazine M1 accommodates a paper roll L1 therein so that the leading end of the paper roll L1 is fed out from a supply opening 21 in the paper magazine M1.

The processing means 69 comprises a paper feeder 22 disposed in front of the supply opening 21 of the paper magazine M1, a paper cutter 23, a paper traverse carrier device 71, and a paper rotation device 34. The paper traverse carrier device 71 is located between the cutter 23 and the paper rotation device 34. The paper feeder 22 comprises a drive roller 25 driven by a motor and a press roller 26 placed directly on the drive roller 25. The drive roller 25 is provided with a rotary encoder for detecting feeding of the paper L1 by measuring the rotation of the drive roller 25. The means for detecting the feeding of the paper is not limited to the rotary encoder and any other appropriate means may be used. The paper cutter 23 comprises a stationary knife 27 and a rotary knife 29 driven by a motor. As a given length of the paper L1 is fed from the paper feeder 22, it is cut to produce a cut material P1 by the cutting action of the rotary knife 29. A paper head detector 72 is provided in the form of an optical sensor between the cutter 23 and the paper transfer device 71 for detecting the head or leading end of the cut material P1.

The paper traverse carrier device 71 comprises a transfer body 73 and a ball screw 74 extending across the transfer body 73. The ball screw 74 is arranged at a right angle to the transfer direction of the cut material P1 and is coupled to a pulse motor for moving the transfer body 73 widthwisely of the cut material P1. The transfer body 73 has an entrance 75 thereof provided with a slitter 76 and a transfer passage therein for passing segments of the cut material P1. The slitter 76 disposed at the entrance 75 comprises a rotary knife 77 drive by a motor and a solenoid 78 coupled by a link assembly to the rotary knife 77. When the solenoid 78 is energized, the rotary knife 77 moves upward.

The transfer body 73 also has an exit 79 provided with a discharge roller assembly 80. The discharge roller assembly 80 comprises two, left and right, drive rollers 81, 82 driven separately by respective motors, and two press rollers 83 and 84 placed directly on the two drive rollers 81 and 82 respectively. The discharge roller assembly 80 allows two cut papers P1 produced from the cut material by the slitter 76 to be transferred separately to the paper rotation device 34.

Figure 15:
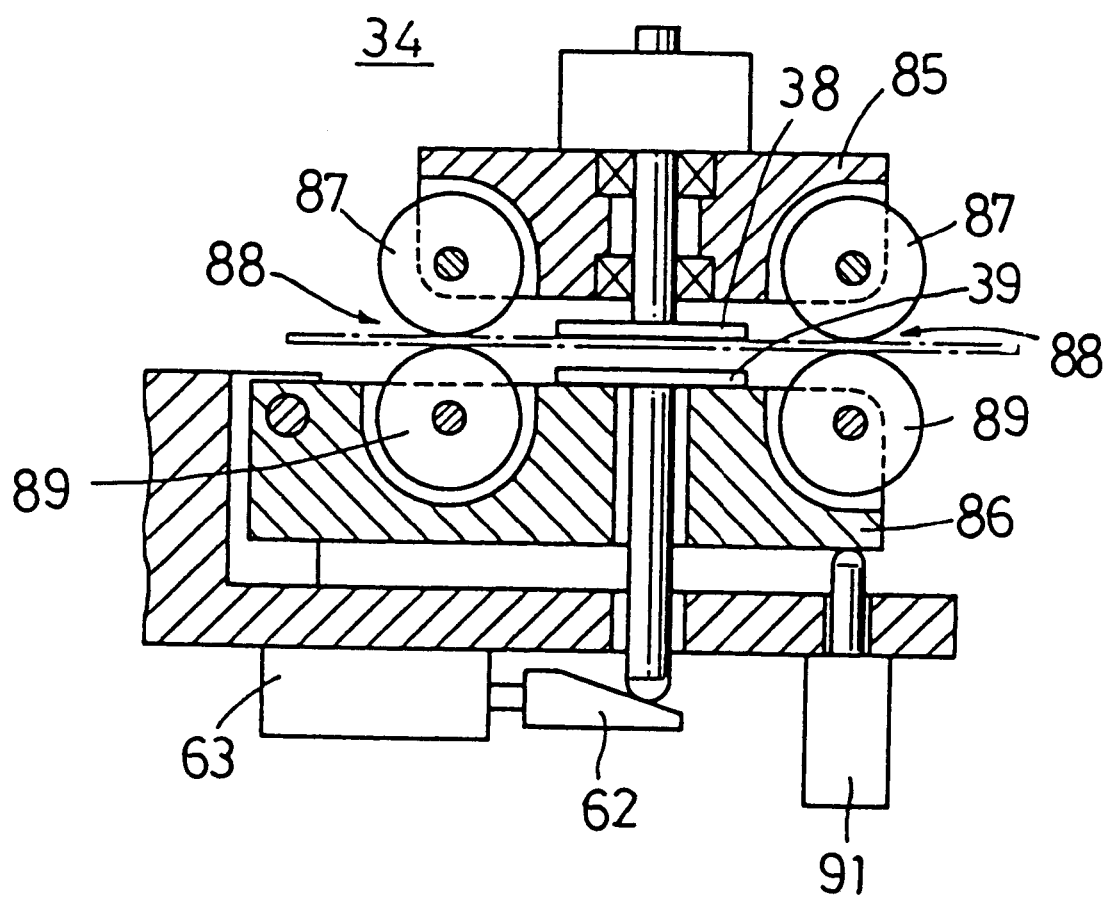
FIG. 15 is a cross sectional view of a paper rotation device of the fourth embodiment.

The paper rotation device 34 is mainly composed of a disk assembly 90, a transfer roller assembly 88, and a press release assembly, as shown in FIG. 15. The disk assembly 90 comprises a pair of disks 38 and 39 mounted to two, upper and lower, supports 85 and 86 respectively. The upper disk 38 mounted to the upper support 85 is driven by a pulse motor for rotation. The lower disk 39 mounted to the lower support 86 has a vertically movable shaft extending downwardly and seated directly on a press cam 62 of a tapered shape which is actuated by a solenoid 63. In operation, the lower disk 39 is moved upward and downward by the action of the solenoid 63 to press against and depart from the upper disk 38. The transfer roller assembly 88 comprises drive rollers 87 located before and after the upper disk 38 and driven by a motor and press rollers 89 located before and after the lower disk 39 and supported by the lower support 86 for pressing against their respective drive rollers 87. The press release assembly comprises a plunger solenoid 91 (referred to as a plunger hereinafter) supported from below by a distal end of the lower support 86. The other end or proximal end of the lower support 86 is mounted by a pin to the frame of the paper rotation device 34 for pivotal movement. As the plunger 91 lifts up the lower support 86, the press rollers 89 are pressed against the drive rollers 87. When the plunger 91 is deenergized, the lower support 86 is lowered, thus allowing the press rollers 89 to depart from their respective drive rollers 87.

For rotation of the cut paper P1 in the paper rotation device 34, the press cam 62 is retracted by the action of the solenoid 63 to lower the lower disk 39 and the transfer roller assembly 88 is actuated to feed the cut paper P1 to the center of the disk assembly 90. Then, the solenoid 63 is turned on to press the lower disk 39 against the upper disk 38 for holding the cut paper P1. After the plunger 91 is retracted to lower the lower support 86 thus allowing the press rollers 89 to depart from the drive rollers 87, the pulse motor is switched on to rotate the upper disk 38 for shifting the orientation of the cut paper P1. When the cut paper P1 has been oriented in a desired direction, the plunger 91 is actuated to lift up the lower support 86 and the solenoid 63 is turned off to lower the lower disk 39 thus releasing the cut paper P1. The cut paper P1 is then advanced in the desired direction when the transfer roller assembly 88 is driven.

The construction and arrangement of a paper conveyor 1 and an exposure station 4 are identical to those of the previous embodiment, are denoted by like numerals and therefore will not be explained.

The controller 70 of the fourth embodiment is connected to a group of detectors and sensors 16, 17, 19, 15, and encoders, a s shown in FIG. 17, and arranged to receive setting data of desired print sizes for printing on the paper L1. Thee cut papers P1 with a desired size are produced from the paper roll L1 by operating the processing means 69 with the setting data.

The operation of the processing means 69 for producing a number of the cut papers P1 of different sizes from the paper roll L1 in the magazine M1 and transferring them to the paper conveyor 1 for printing at the exposure station 4 will now be explained.

It is assumed that the different sizes of the cut papers P1 to be produced from the paper roll L1 of 8 inches in width (20.3 cm) in the magazine M1 include 8×5 inch (20.3×12.7 cm), 10×8 inch (25.4×20.3 cm), 12×8 inch (30.5×20.3 cm), and 4×6 inch (10.2×15.2 cm) formats. According to the fourth embodiment, the paper traverse carrier device 71 allows a greater number of sizes of the cut paper P1 to be prepared.

When a film F is loaded and a desired print size is entered, it is examined by the image size detector 19 to determine whether a frame of images to be printed is of a full size or a half size before being carried to the automatic negative mask 12. If full size is detected, it is also examined to determine whether the frame is a HDTV format or a panorama format. The controller 70 determines the size of the cut paper P1 through examining feeding direction data of the film feeding direction detector 16 for printing at the exposure station 4 and image size data of the image size detector 19 and instructs the processing means 69 to produce the cut papers P1 of necessary size.

Description will begin with production of a cut paper P1 of 8×5 size. The paper roll L1 having a width of 8 inches is used as shown in A of FIG. 18 (a). As the cut paper P1 is identical in width to the paper roll L1, it is produced by only cutting a length of 5 inches from the paper roll L1. While the solenoid 78 in the paper traverse carrier device 71 is unactuated and the slitter 76 on the transfer body 73 is not set for cutting, the drive rollers 25, 81, and 82 in the paper feeder 22 and the paper traverse carrier device 71 are driven for feeding out the leading end of the paper roll L1 from the magazine M1 towards the paper conveyor 1. When the leading end of the paper L1 reaches the paper head sensor 72, it is advanced to a desired length or 5 inches (as measured by the encoder mounted to the drive roller 25 of the paper feeder 22). After the drive rollers 25, 81, and 82 of the paper feeder 22 and the paper traverse carrier device 71 are stopped with the paper L1 being held securely, the paper cutter 23 is actuated for separating an 8×5 size of the cut paper P1 from the paper L1. When the drive rollers 81, 82, and 87 of the paper traverse carrier device 71 and the paper rotation device 34 are started, the cut paper P1 is carried to the paper conveyor 1 for printing at the exposure station 4.

For producing 10×8 and 12×8 sizes of the cut paper P1, the procedure is similar to the production of the 8×5 size, except that the orientation of the cut papers P1 is different as shown in B and C of FIG. 18 (a). As the film F is loaded to the exposure station 4 in its lengthwise direction, the cut paper P1 has to be oriented in the same direction. For such purpose, the cut paper P1 from the paper traverse carrier device 71 is rotated 90 degrees by the action of the paper rotation device 34 before being loaded to the conveyor 1 for printing at the exposure station 4.

In the above two cases, the width of the paper roll L1 is identical to one side of the cut paper P1,, such that use of the paper traverse carrier device 71 of the processing means 69 is not necessary. The preparation of different sizes of the cut paper P1 with the paper traverse carrier device 71 will be explained where the width of the paper roll L1 is greater than one side of the cut paper P1.

For producing a 4×6 size of the cut paper P1, the paper roll L1 of 8 inches wide has to be slit into halves as shown in D of FIG. 18 (a). The solenoid in the paper traverse carrier device 71 is first actuated for setting the slitter 76 at the entrance 75. The ball screw 74 is driven to move the transfer body 73 so that the rotary knife 77 of the slitter 76 is located at a desired cutting position determined from the print size relative to the width of the paper roll L1 in the magazine M1. The drive rollers 25, 81, and 82 of the paper feeder 22 and the paper traverse carrier device 71 are then actuated to feed out the leading end of the paper roll L1 from the magazine M1. When the leading end reaches the paper head detector 72. It is advanced 6 inches. After the drive rollers 25, 81, and 82 of the paper feeder 22 and the paper traverse carrier device 71 are stopped to hold the paper L1, the paper cutter 23 is turned on to produce a 6-inch long strip. The 6-inch strip is then slit by the slitter 76 into two halves. The two cut papers P1 of a 4×6 size are then carried in sequence towards the conveyor 1 by the action of the roller assembly 80.

Figure 19A:
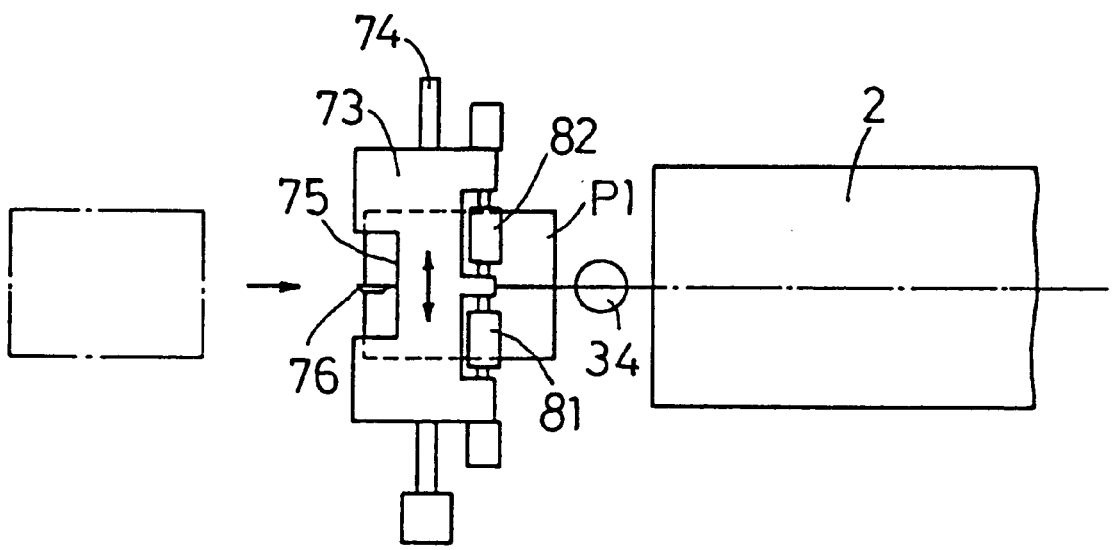
FIGS. 19 (a) and 19 (b) are schematic plan views showing operation of a paper traverse carrier device of the fourth embodiment.
Figure 19B:
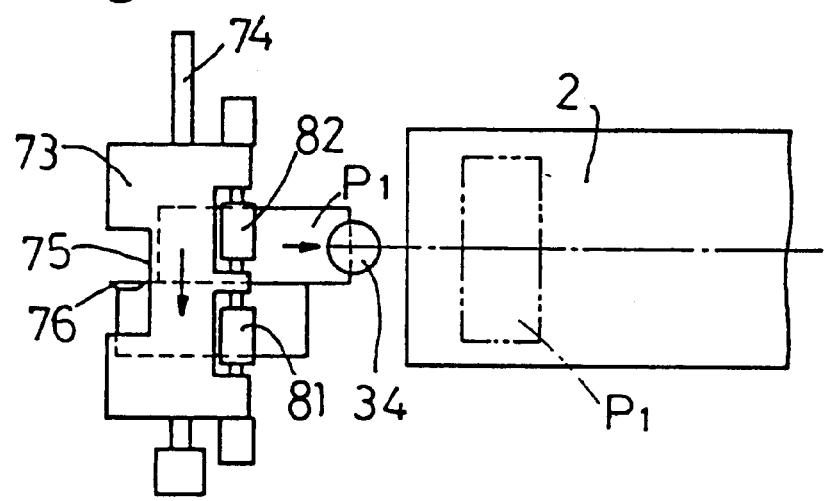

The center line of each cut paper P1 is not coincided with the center line of the exposure station 4 as shown in FIG. 19 (a). For correction, the ball screw 74 is driven to move the transfer body 73 with the cut papers P1 until the center line of one of the two cut papers P1 is aligned with the center line of belt 2 of the conveyor 1, as shown in FIG. 19 (b). Then, the two cut papers P1 are discharged in a row towards the paper rotation device 34 by actuating their respective drive rollers 81 and 82 separately.

When the paper rotation device 34 receives a longitudinal printing instruction of the controller 70 corresponding to the data from the image size detector 19 and the film feeding direction detector 16, it passes the cut papers P1 directly to the paper conveyor 1 without shifting their orientation. When the paper rotation device 34 receives a traverse printing instruction, it turns the cut papers P1 by 90 degrees before loaded to the conveyor 1 for printing at the exposure station 4.

As set forth above, the processing means 69 of the fourth embodiment includes the paper traverse carrier device 71 so that different sizes of the cut papers P1 are prepared from the single paper roll L1 in the magazine M1 and supplied to the exposure station 4 for both longitudinal and transverse printing operations.

Figure 20:
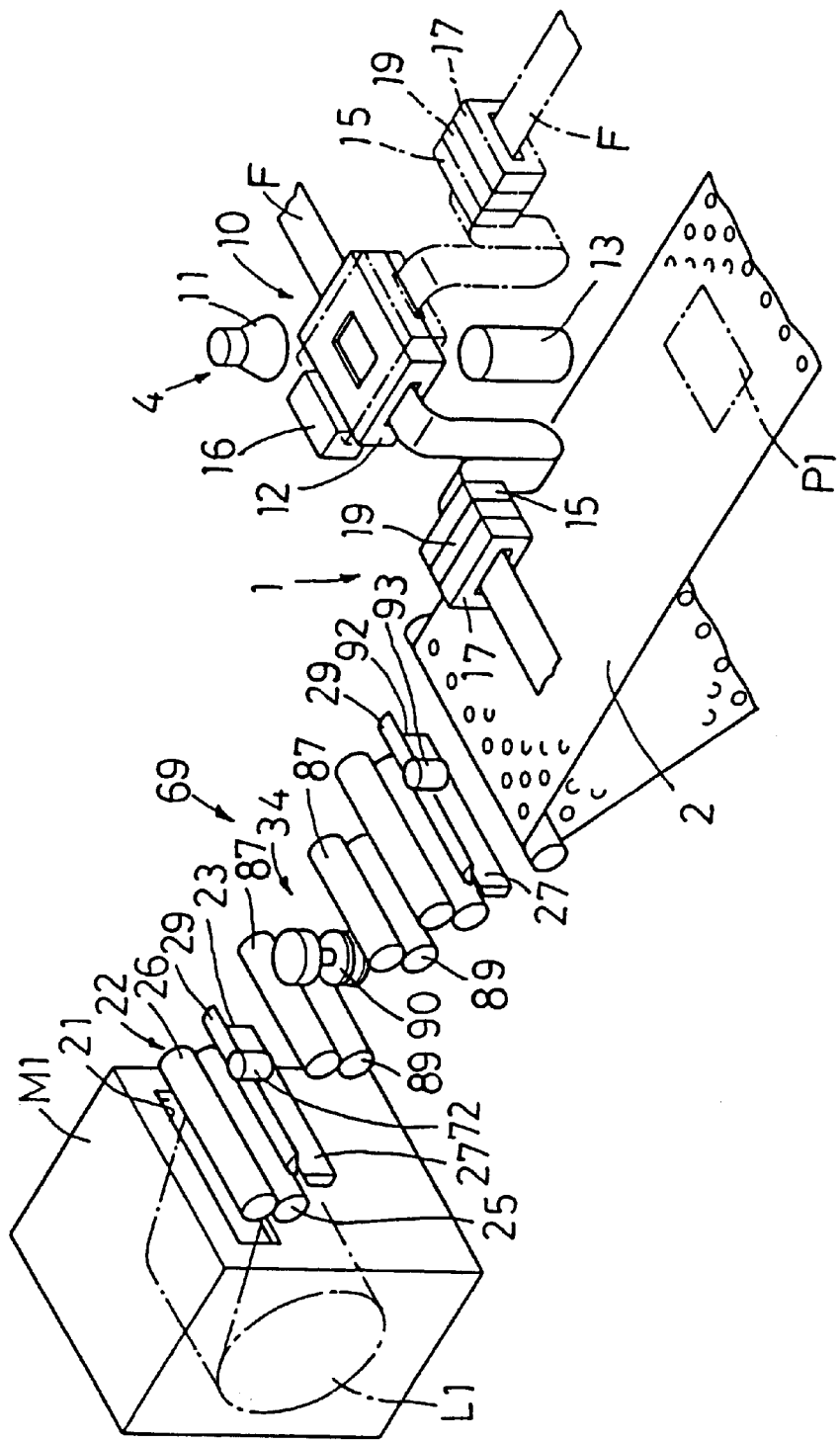
FIG. 20 is an overall perspective view showing a fifth embodiment of the present invention.

FIG. 20 shows a fifth embodiment: of the present invention.

In a photographic material feeder apparatus of the fifth embodiment, the paper traverse carrier device 71 of the fourth embodiment is replaced by a second cutter 92 provided between the paper rotation device 34 and the paper conveyor 1. The second cutter 92 is similar to the paper cutter 23 disposed between the paper feeder 22 and the paper rotation device 34 and includes a stationary knife 27 and a rotary knife 29 driven by a motor. A second paper head detector 93 is provided in the form of an optical sensor between the second cutter 92 and the paper conveyor 1 for detecting the head or leading end of a paper strip P1.

A processing means 69 of the fifth embodiment comprising the paper feeder 22, the paper cutter 23, and the paper rotation device 34 is similar to that of the fourth embodiment. When one side of the cut papers P1 including, e.g. 8×5, 10×8, and 12×8 inch formats, is identical to the width of a paper roll L1, the action of the second cutter 92 between the paper rotation device 34 and the conveyor 1 is not needed. The cut papers P1 of desired sizes can be produced by the paper feeder 22, the cutter 23, and the paper rotation device 34.

Thus, the description of operation of those like components will not be repeated but the use of the second cutter 92 between the paper rotation device 34 and the conveyor 1 will be explained in detail where one side of the cut paper P1 such as 4×6 inch format is smaller than the width of the paper roll L1.

Figure 21:
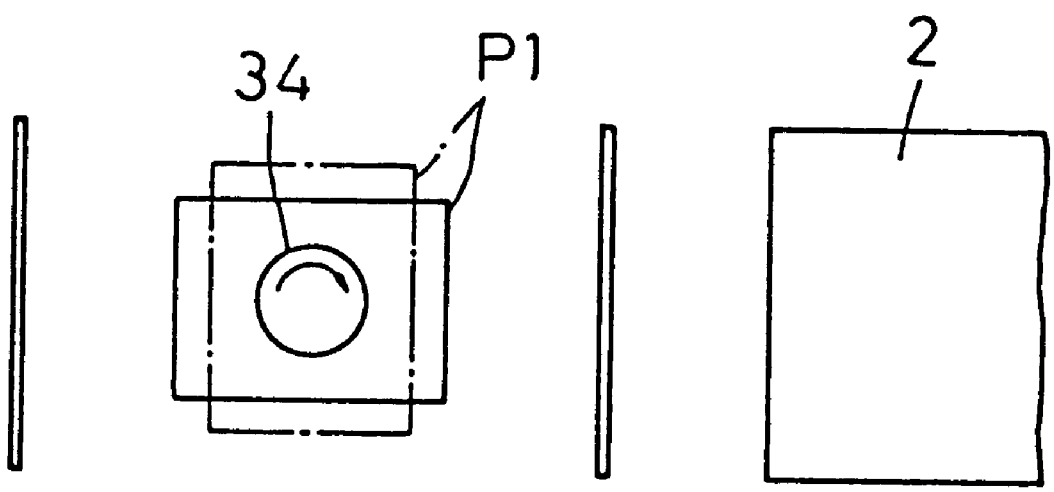
FIG. 21 is a schematic view of transferring cut papers in the fifth embodiment.

For preparing the 4×6 size cut paper P1 shown in D of FIG. 18 (a), drive rollers 25 and 87 of the paper feeder 22 and the paper rotation device 34 are actuated to feed out the leading end of the paper roll L1. When the leading end reaches head detector 72, it is advanced and cut to a length of 6 inches by the paper cutter 23. The 6-inch length strip is then fed to the paper rotation device 34 so that its center is aligned with the center of a disk assembly 90 of the paper rotation device 34. If transverse printing is required, the paper rotation device 34 turns the paper strip by 90 degrees as shown in FIG. 21 before transferring it to the second cutter 92. After the leading end of the paper strip reaches the second head sensor 93, it is advanced and cut to a length of 4 inches by the second cutter 92, thus producing a 4×6 size. The resultant 4×6 size of the cut paper P1 is then loaded to the paper conveyor 1 for printing at the exposure station 4. The remaining half of the paper strip is directly passed to the conveyor 1 without the action of the second cutter 92. The size of a cut paper P1 in the fifth embodiment is not limitative but illustrative and any other appropriate size can be prepared with equal success by varying the cutting length in the second cutter 92.

As set forth above, the processing means 69 of the fifth embodiment includes the second cutter 92 provided between the paper rotation device 34 and the paper conveyor 1 so that different sizes of the cut paper P1 can be prepared from the single paper roll L1 in the magazine M1 for supply to the exposure station 4.

Figure 22:
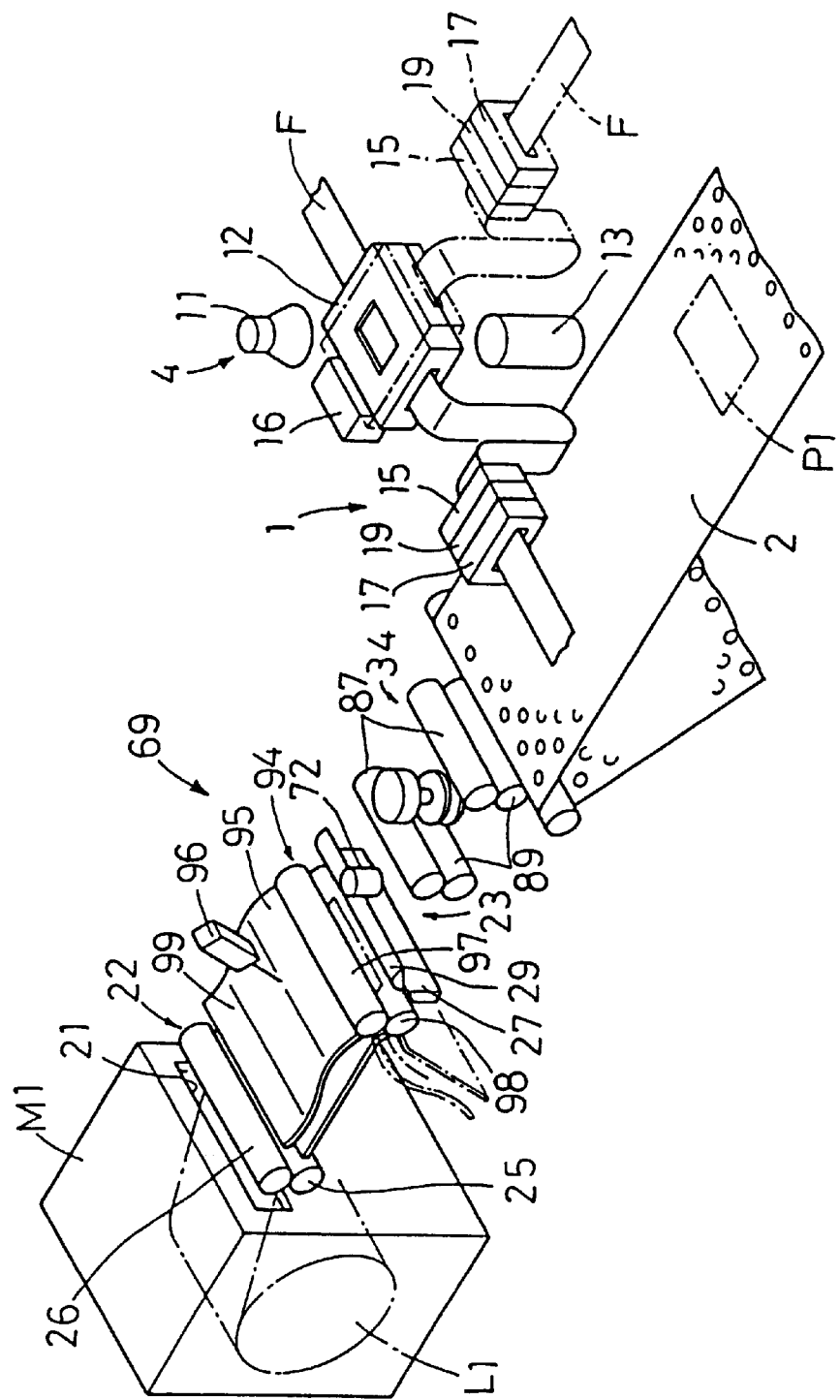
FIG. 22 is an overall perspective view showing a sixth embodiment of the present invention.

FIG. 22 illustrates a sixth embodiment of the present invention.

In the sixth embodiment, the paper traverse carrier device 71 of the fourth embodiment is replaced by a paper holding means for holding a cut paper P1 temporarily provided between the paper feeder 22 and the paper cutter 23 and a paper shifting means provided between the paper cutter 23 and the paper rotation device 34 for moving the cut paper P1 forward and backward. The paper holding means is mainly composed of a driving roller assembly 94, a paper guide 95, and a plunger 96 for changing the direction of the paper guide 95. The driving roller assembly 94 comprises a drive roller 97 driven by a motor for forward, backward, and stop operation and a press roller 98 placed directly on the drive roller 97. The paper guide 95 comprises two guide plates 99 coupled to the driving roller assembly 94 for upward and downward movements. The upper guide plate 99 is coupled to the plunger 96 for turning a transfer path between the guide plates 99 to shift the feeding direction of the cut paper P1. The paper shifting means is provided by reverse operation of drive rollers 87 of the paper rotation device 34 which is performed by the controller 70 transmitting a reverse operation signal to a motor. Accordingly, the cut paper P1 can be moved forward and backward.

The fundamental functions of the processing means 69 of the sixth embodiment or the operations of the paper feeder 22, the paper cutter 23, and the paper rotation device 34 are identical to those of the fourth or fifth embodiment. When the width of a paper roll L1 is equal to one side of the cut paper P1, desired sizes of the cut paper P1 can be prepared through the operations of the paper feeder 22, the paper cutter 23, and the paper rotation device 34 similar to the fourth or fifth embodiment. Description of those operations is not repeated. The preparation of 4×6 size cut papers P1 shown in D of FIG. 18 (a) with the use of the paper holding means and the paper shifting means will be explained provided that the width of the paper roll L1 is larger than one side of the cut paper P1.

In operation, the leading end of the paper roll L1 is drawn out by the action of the drive rollers of the paper feeder 22, the driving roller assembly 94, and the paper rotation device 34 and passed between the guide plates 99. When the leading end reaches paper head sensor 72, it is advanced and cut to a length of 6 inches by the cutter 23. The 6-inch strip of a cut paper P1 is then fed to the paper rotation device 34 so that its center is aligned with the center of rotation of the rotation device 34. After the cut paper P1 is turned 90 degrees, it is moved backward. For preventing collision with the backward moving cut paper P1, the leading end of the paper L1 is retracted from the guide assembly 95 by the reverse action of drive roller 25 of the paper feeder 22 until it is positioned inside the magazine M1.

After the plunger 96 is actuated to lower the guide plates 99, the cut paper P1 is moved backward by the reverse action of the drive rollers 87 and 97 of the paper rotation device 34 and the driving roller assembly 94. Upon reaching paper head sensor 71, the cut paper P1 stops its backward movement. As a result, the cut paper P1 is held by the driving roller assembly 94 as its major portion stays in the paper guide 95. The cut paper P1 is then driven by the driving roller assembly 94 towards the paper rotation device 34. When the cut paper P1 reaches the paper head sensor 72, it is now advanced by a distance of 4 inches. When the paper cutter 23 is actuated, a 6×4 size of the cut paper P1 is produced. For transverse printing, the 6×4 cut paper P1 is passed through the paper rotation device 34 without rotation and loaded directly to the paper conveyor 1. For longitudinal printing,, the cut paper P1 is turned 90 degrees by the paper rotation device 34 before being loaded to the conveyor 1. Accordingly, the cut papers P1 of a desired size can be supplied to the exposure station 4 for both longitudinal and transverse printing operations. The remaining 6-inch strip is also transferred directly to the paper conveyor 1 by the action of the driving roll assembly 94 without the use of the cutter 23, and may be subjected to the action of the paper rotation device 34 depending on whether longitudinal or transverse printing is required.

As set forth above, the cut paper P1 is turned by the paper rotation device 34 and then is moved backward by the paper shifting means before being held in the paper holding means. This allows the single cutter 23 to perform a series of cutting actions on the cut paper P1 to produce a desired size from the paper roll L1 with a larger width.

The width of the paper roll L1 is not limited to 8 inches (20 cm) and other appropriate widths of roll such as 10 or 12 inches shown in FIGS. 18 (b) and 18 (c) may be employed corresponding to desired print sizes determined at the exposure station 4.

What is claimed is:

1. A photographic material feeder apparatus comprising:

a paper conveyor having a loading end, an opposite end spaced from said loading end, and opposite first and second sides extending between said loading end and said opposite end;

an exposure station positioned at said opposite end of said conveyor;

a plurality of paper magazines arranged in a cluster around said loading end of said conveyor, each said magazine accommodating therein a paper roll having a width corresponding to a size of a film image to be printed, and each of said magazines having a paper supply opening, said plurality of paper magazines including at least a first paper magazine located at said loading end of said conveyor with said paper supply opening of said first paper magazine directed toward said loading end, a second paper magazine located at said first side of said conveyor with said paper supply opening of said second paper magazine directed toward said first side of said conveyor, and a third paper magazine located adjacent said second side of said conveyor with said paper supply opening of said third paper magazine directed toward said second side of said conveyor;

a plurality of paper feeders, each positioned adjacent said opening of a respective one of said magazines and operable to feed therefrom a strip of paper from a respective roll towards said conveyor;

a plurality of paper cutters, each positioned adjacent a respective one of said paper feeders and operable to cut the strip of paper fed thereby from the respective said magazine to a given length to produce a desired size of cut paper to be fed to said conveyor;

each said paper feeder and the respective said paper cutter being located at a position closely adjacent said conveyor such that, as said each paper feeder feeds the strip of paper and the strip of paper is cut by said respective paper cutter to produce the cut paper, the cut paper is deposited directly on said conveyor from said paper cutter; and whereafter said conveyor is operable to convey the cut paper to said opposite end whereat said exposure station is operable to expose the cut paper to the film image to be printed.

2. A photographic material feeder apparatus according to claim 1, further comprising an image size sensor for detecting the size of the image in a film to be printed, width detecting means for each said magazine for detecting the width of the paper roll therein, and a controller responsive to image size data from said image size sensor and to paper roll width data from said width detecting means for selection the paper roll of one of said magazines and for actuating said paper feeder and said paper cutter for said one magazine of the selected paper roll to produce the desired size of the respective cut paper corresponding to the detected size of the image of the film to be printed for feeding to said loading end of said conveyor.

3. A photographic material feeder apparatus according to claim 2, wherein said width detecting means comprises a pattern of pins on each said magazine and representative of the width of the paper roll thereof, and a plurality of sensors mounted to detect a respective one of said pattern of pins for each of said magazines and to supply said width data representative thereof to said controller.

* * * * *